(12) United States Patent
Konishi et al.

(10) Patent No.: US 11,215,974 B2
(45) Date of Patent: Jan. 4, 2022

(54) FACTORY AUTOMATION (FA) SYSTEM, CONTROLLER, AND CONTROL METHOD

(71) Applicant: OMRON Corporation, Kyoto (JP)

(72) Inventors: Fumiaki Konishi, Kusatsu (JP); Yoichi Kurokawa, Kyoto (JP); Hisanori Igarashi, Muko (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/643,549

(22) PCT Filed: Jan. 28, 2019

(86) PCT No.: PCT/JP2019/002736
§ 371 (c)(1),
(2) Date: Feb. 29, 2020

(87) PCT Pub. No.: WO2019/176337
PCT Pub. Date: Sep. 19, 2019

(65) Prior Publication Data
US 2020/0201297 A1    Jun. 25, 2020

(30) Foreign Application Priority Data

Mar. 12, 2018   (JP) .............................. JP2018-043851

(51) Int. Cl.
*G05B 19/414* (2006.01)
*G05B 19/418* (2006.01)

(52) U.S. Cl.
CPC ................... *G05B 19/4185* (2013.01); *G05B 2219/33244* (2013.01)

(58) Field of Classification Search
None
See application file for complete search history.

(56) References Cited

U.S. PATENT DOCUMENTS 5,166,928 A * 11/1992 Nishioka ................. H04L 43/00
345/5
7,146,408 B1 * 12/2006 Crater ................ G05B 19/4185
709/219

(Continued)

FOREIGN PATENT DOCUMENTS

JP    H08-331146 A    12/1996
JP    H11-134007 A    5/1999

(Continued)

OTHER PUBLICATIONS

English translation of the International Search Report("ISR") of PCT/JP2019/002736 dated Apr. 16, 2019.

(Continued)

*Primary Examiner* — Philip Wang
*Assistant Examiner* — Rongfa P Wang
(74) *Attorney, Agent, or Firm* — Metrolex IP Law Group, PLLC

(57) ABSTRACT

A technique capable of preventing the loss of packet data for any appropriate one of controllers connected to the same network is provided. An FA system includes a plurality of controllers. Each of the controllers includes: a buffer; a communication module for performing packet communication with one or more other controllers; a packet monitor module for buffering packet data generated in its own controller and packet data received by its own controller in the buffer; and a stop module for stopping, in response to a predetermined stop condition being satisfied, a buffering function of the packet monitor module for a controller specified from the plurality of controllers.

6 Claims, 20 Drawing Sheets

(56) References Cited

U.S. PATENT DOCUMENTS

| | | | |
|---|---|---|---|
| 2008/0025508 A1* | 1/2008 | Lee | H04N 7/1675 380/201 |
| 2010/0162009 A1* | 6/2010 | Togashi | H02J 13/00028 713/300 |
| 2010/0198781 A1* | 8/2010 | Yuine | G05B 19/052 707/609 |
| 2010/0290402 A1* | 11/2010 | Backman | H04L 45/123 370/328 |
| 2011/0026407 A1* | 2/2011 | Yamada | G05B 23/0264 370/242 |
| 2012/0164979 A1* | 6/2012 | Bachmann | H04W 12/062 455/411 |
| 2017/0325124 A1* | 11/2017 | Mitra | H04L 47/34 |
| 2017/0339109 A1* | 11/2017 | Zeng | G05B 19/41855 |
| 2019/0215427 A1* | 7/2019 | Yamamoto | G03B 15/16 |

FOREIGN PATENT DOCUMENTS

| | | |
|---|---|---|
| JP | 2000-047707 A | 2/2000 |
| JP | 2001-117607 A | 4/2001 |
| JP | 2011-035664 A | 2/2011 |
| JP | 2012-181784 A | 9/2012 |
| KR | 2017-0096893 A | 8/2017 |

OTHER PUBLICATIONS

Written Opinion("WO") of PCT/JP2019/002736 dated Apr. 16, 2019.

Extended European Search Report ("EESR") dated Nov. 4, 2021 in counterpart European Application.

* cited by examiner

| SETTING SCREEN | | | | |
|---|---|---|---|---|
| OPERATION MODE | EXECUTION CONDITION | CONTROLLER FOR WHICH INSTRUCTION IS INTENDED | | NOTIFY |
| | | OWN CONTROLLER (CONTROLLER 100A) | IP ADDRESS B (CONTROLLER 100B) | |
| STOP ▷ | ABNORMAL VARIABLE (EIP_Error) ▷ | OWN CONTROLLER (CONTROLLER 100A) ▷ | IP ADDRESS B (CONTROLLER 100B) ▷ | ON ▷ |
| STOP ▷ | ERROR OF INSTRUCTION A ▷ | OWN CONTROLLER (CONTROLLER 100A) ▷ | IP ADDRESS B (CONTROLLER 100B) ▷ | ON ▷ |
| STOP ▷ | INSTRUCTION A STARTS OPERATION ▷ | OWN CONTROLLER (CONTROLLER 100A) ▷ | IP ADDRESS B (CONTROLLER 100B) ▷ | OFF ▷ |
| START | ABNORMAL VARIABLE (EIP_Error) | CONTROLLER 100A | CONTROLLER 100A | ON |
| STOP | ERROR OF INSTRUCTION A | CONTROLLER 100B | CONTROLLER 100B | OFF |
| SAVE | ... | ... | ... | |
| TRANSFER | | | | |

SAVE  CANCEL

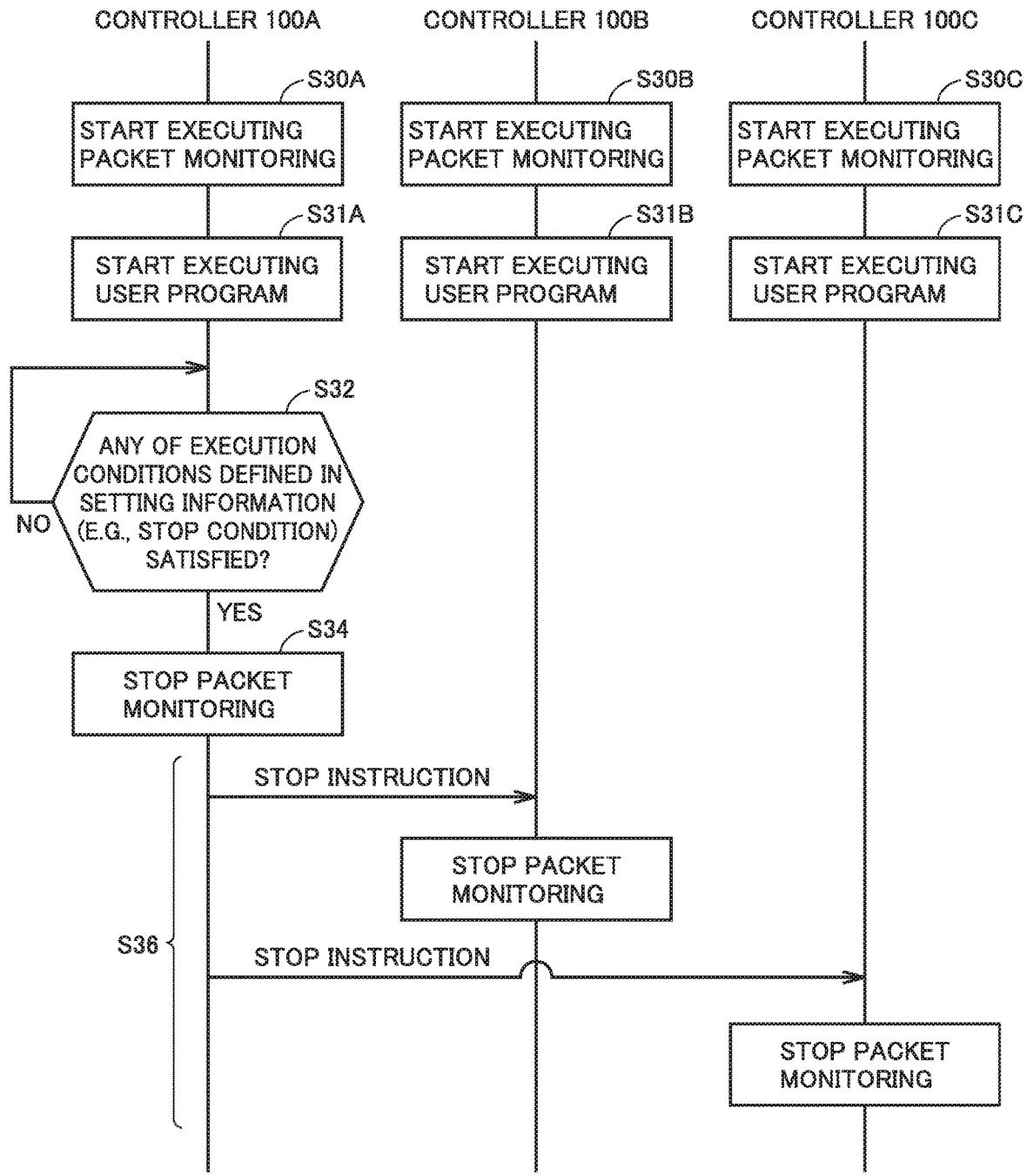

FIG.7
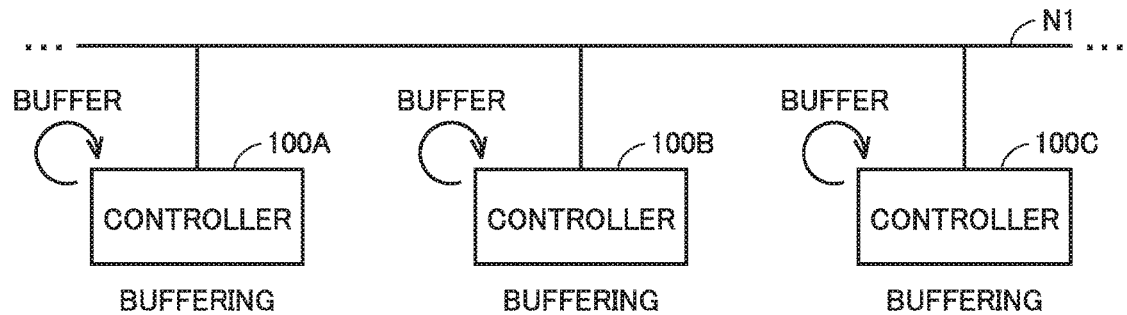
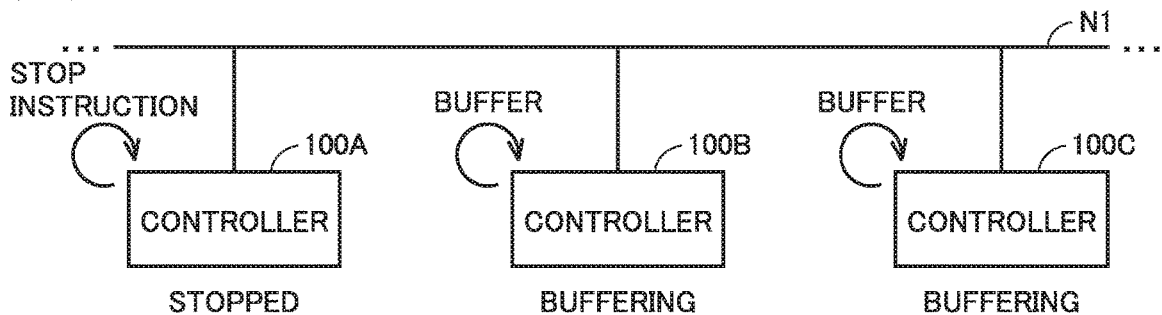
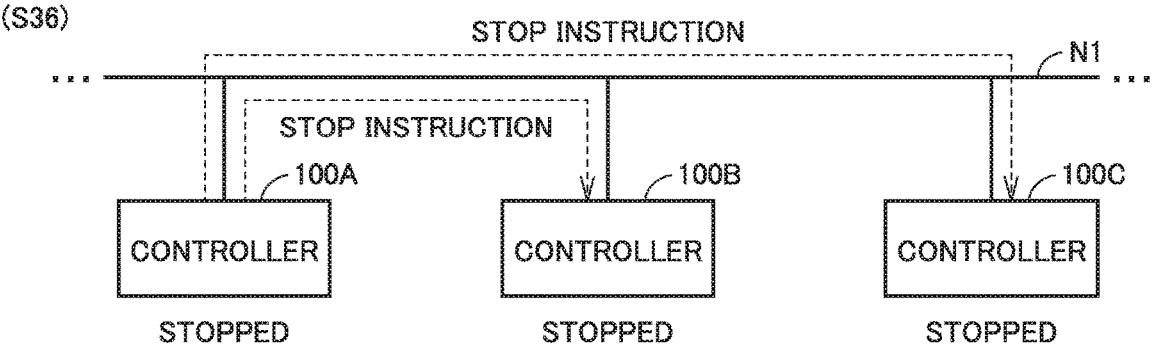

| TROUBLESHOOT/EVENT LOG | | | | | | |
|---|---|---|---|---|---|---|
| CONTROLLER ABNORMALITY × \ CONTROLLER EVENT LOG × \ USER ABNORMALITY × \ USER EVENT LOG × \ | | | | | | |
| DISPLAY SELECTION | IMPORTANCE | SOURCE | SOURCE DETAILS | EVENT NAME | EVENT CODE | |
| ALL<br>CONTROLLER | ⚠ MINOR FAULT | EtherNet/IP | COMMUNICATION PORT | STOP PACKET MONITORING | 0x34230000 | DETAILS |
| | ⚠ MINOR FAULT | EtherNet/IP | COMMUNICATION PORT | STOP PACKET MONITORING | 0x34230000 | DETAILS |
| | ⁝ | ⁝ | ⁝ | ⁝ | ⁝ | DETAILS |
| | ⁝ | ⁝ | ⁝ | ⁝ | ⁝ | DETAILS |

COLLECTION RESULTS — □ ×  30(37B)

SEARCH CONDITION
☑ PACKET DATA OF OWN CONTROLLER (CONTROLLER 100A)
☑ PACKET DATA OF CONTROLLER 100B
☐ PACKET DATA OF CONTROLLER 100C

— 85

| NO | SOURCE IP ADDRESS | SOURCE IP ADDRESS | PROTOCOL | PORT NUMBER | REMARKS |
|---|---|---|---|---|---|
| 1 | 192.168.250.1 | 192.168.250.3 | TCP | 70 | 65532 → 21[ACK] Seq=1 Ack=1 |
| 2 | 192.168.250.3 | 192.168.250.1 | FTP | 114 | Response: 220 NX701-1700 |
| 3 | 192.168.250.1 | 192.168.250.3 | FTP | 82 | Request: USER Omron |
| 4 | 192.168.250.3 | 192.168.250.1 | FTP | 104 | Response: 331 Password requi |
| 5 | 192.168.250.1 | 192.168.250.3 | FTP | 85 | Request: PASS Omron123 |
| 6 | 192.168.250.3 | 192.168.250.1 | FTP | 97 | Response: 230 User Omron log |
| 7 | 192.168.250.1 | 192.168.250.3 | FTP | 76 | Request: SYST |
| ... | ... | ... | ... | ... | ... |

| FUNCTION | INSTRUCTION CODE | ATTRIBUTE | PARAMETER RANGE | DEFAULT | DESCRIPTION |
|---|---|---|---|---|---|
| ENABLE/DISABLE OF PACKET MONITORING FUNCTION | 0x4E(GET) 0x4F(SET) | R/W | 0-1 | 0 | 0: DISABLE 1: ENABLE |
| INTERFACE FOR CAPTURING | | R/W | 1,10 | 1 | 1: Ethernet 10: USB |
| START/NOT START PACKET MONITORING FUNCTION AT STARTUP OF CONTROLLER | 0x4E(GET) 0x4F(SET) | R/W | 0-1 | 0 | 0: NOT START → NOT START PACKET MONITORING FUNCTION AT STARTUP OF CONTROLLER (DURING OFF → ON OF CONTROLLER POWER SUPPLY OR DURING RESET PROCESS OF CONTROLLER) 1: START → START PACKET MONITORING FUNCTION AT STARTUP OF CONTROLLER (DURING OFF → ON OF CONTROLLER POWER SUPPLY OR DURING RESET PROCESS OF CONTROLLER) |
| DATA SIZE PER CAPTURED FILE | | R/W | 1-20 | 10 | SIZE OF THIS SET VALUE × 100 kbytes IS SINGLE FILE SIZE |
| NUMBER OF CAPTURED FILES | | R/W | 2-40 | 2 | NUMBER OF FILES TO BE CAPTURED |

FIG.19

| FUNCTION | INSTRUCTION CODE | DESCRIPTION |
|---|---|---|
| START PACKET MONITORING FUNCTION | 0x4B | START PACKET MONITORING.<br>· RETURN NORMAL RESPONSE WHEN STARTED NORMALLY.<br>· RETURN ABNORMAL RESPONSE WHEN THIS START INSTRUCTION IS INPUT DURING START.<br>· RETURN ABNORMAL RESPONSE WHEN THIS START INSTRUCTION IS INPUT WHILE PACKET CAPTURING FUNCTION IS SET TO DISABLED. |
| STOP PACKET MONITORING FUNCTION | 0x4C | STOP PACKET MONITORING.<br>· RETURN NORMAL RESPONSE WHEN STOPPED NORMALLY.<br>· RETURN ABNORMAL RESPONSE WHEN THIS STOP INSTRUCTION IS INPUT DURING STOP.<br>· RETURN ABNORMAL RESPONSE WHEN THIS STOP INSTRUCTION IS INPUT WHILE PACKET CAPTURING FUNCTION IS SET TO DISABLED. |
| SAVE PACKET DATA | 0x4D | STORE PACKET DATA IN MEMORY CARD.<br>CREATE DIRECTORY WHEN THERE IS NO DIRECTORY IN MEMORY CARD. DIRECTORY NAME AND FILE NAME ARE FIXED. OVERWRITE WHEN THERE IS FILE OF SAME NAME IN MEMORY CARD.<br>· RETURN ABNORMAL RESPONSE WHEN THIS SAVE INSTRUCTION IS INPUT DURING EXECUTION OF PACKET MONITORING PROCESS.<br>· RETURN ABNORMAL RESPONSE WHEN THERE IS NO PACKET DATA TO BE SAVED.<br>· RETURN ABNORMAL RESPONSE WHEN: MEMORY CARD HAS NOT BEEN INSERTED; WRITING TO MEMORY CARD IS INHIBITED; MEMORY CARD HAS RUN OUT OF SPACE; OR THE NUMBER OF FILES THAT CAN BE CREATED IN MEMORY CARD EXCEEDS UPPER LIMIT.<br>· OTHERWISE RETURN NORMAL RESPONSE IN RESPONSE TO COMPLETION OF PROCESS OF WRITING TO MEMORY CARD. |

FIG.20

| FUNCTION | INSTRUCTION CODE | ATTRIBUTE | PARAMETER RANGE | DESCRIPTION |
|---|---|---|---|---|
| ACQUIRE STATE OF PACKET MONITOR MODULE | 0x52 | R | 0-2 | 0: STATE IN WHICH PACKET MONITORING IS SET TO DISABLED<br>1: STATE IN WHICH PACKET MONITORING IS BEING STOPPED<br>2: STATE IN WHICH PACKET MONITORING IS BEING EXECUTED |

FACTORY AUTOMATION (FA) SYSTEM, CONTROLLER, AND CONTROL METHOD

TECHNICAL FIELD

The present disclosure relates to a technique for stopping a process of buffering packet data for any appropriate controller.

BACKGROUND ART

Industrial control devices (hereinafter also referred to as "controllers") such as programmable logic controllers (PLCs) and robot controllers have been introduced to various production sites. The controllers control various types of industrial driving devices to thereby automate manufacturing processes.

The controller controls the driving device via a field network that performs fixed-cycle communication such as EtherCAT (registered trademark). Packet data is transmitted over this field network, and the controller and the driving device communicate with each other by reading data from and writing data to this packet data.

The packet data is saved in a buffer within the controller for abnormality analysis and the like. Since the buffer has a limited capacity, some of the packet data in the buffer is deleted when the buffer is overflown. For abnormality analysis, packet data immediately prior to the occurrence of abnormality is important. Regarding techniques for preventing such loss of packet data, Japanese Patent Laying-Open No. 2011-35664 (PTL 1) discloses a controller intended to "enable an abnormality analysis to be easily and reliably performed in the FA system of the EtherCAT." This controller stops a packet monitoring function upon occurrence of abnormality, to prevent the deletion of important packet data.

CITATION LIST

Patent Literature

PTL 1: Japanese Patent Laying-Open No. 2011-35664

SUMMARY OF INVENTION

Technical Problem

A plurality of controllers may be connected to the same network. To conduct a more detailed analysis, not only packet data buffered in one controller but also packet data buffered in another controller may be needed. It is thus desired to prevent the loss of packet data for any appropriate one of controllers connected to the same network.

The present disclosure has been made to solve the above problem, and an object in one aspect thereof is to provide a technique capable of preventing the loss of packet data for any appropriate one of controllers connected to the same network.

Solution to Problem

In one example of the present disclosure, there are provided a plurality of controllers each of Which controls a driving device to be controlled. The plurality of controllers each include: a buffer; a communication module for performing packet communication with one or more other controllers; a packet monitor module for buffering packet data generated in its own controller and packet data received by its own controller in the buffer; and a stop module for stopping, in response to a predetermined stop condition being satisfied, a buffering function of the packet monitor module for a controller specified from the plurality of controllers.

According to this disclosure, each controller can stop not only the buffering function in its own controller, but also the buffering function in another controller. Thus, not only the loss of packet data buffered in its own controller, but also the loss of packet data buffered in the another controller can be prevented.

In one example of the present disclosure, the stop module stops, in response to receiving a stop instruction to stop a buffering function from the one or more other controllers, a buffering function of the packet monitor module in its own controller.

According to this disclosure, the stop module can stop the buffering function not only by transmitting the instruction to stop a buffering function to another controller, but also by receiving the stop instruction from the another controller.

In one example of the present disclosure, the packet data has source information for identifying a source controller, and destination information for identifying a destination controller. The FA system further includes an external device configured to communicate with the plurality of controllers. The external device includes a communication module for receiving packet data stored in the buffer of each of the plurality of controllers from each of the plurality of controllers, and a display for displaying the source information and the destination information about each packet data received from each of the plurality of controllers.

According to this disclosure, a record of packet data remains in both a source controller and a destination controller. Therefore, if a pair of records does not remain in controllers, it means that the packet data has been lost for some reason. The display of the source information and the destination information for each packet data allows a user to easily determine which packet data has been lost in which controller.

In one example of the present disclosure, the display displays packet data having matching source information and matching destination information in a corresponding manner.

According to this disclosure, the user can more easily find out which packet data has been lost in which controller.

In one example of the present disclosure, the display displays packet data, in which a pair of packet data having matching source information and matching destination information does not exist, in a display mode different from other packet data.

According to this disclosure, the user can immediately find out which packet data has been lost.

In one example of the present disclosure, the plurality of controllers each include an interface unit for connecting an external storage device, and a save module for saving, in response to a predetermined save condition being satisfied, packet data stored in the buffer of the controller specified from the plurality of controllers in the external storage device connected to the specified controller.

According to this disclosure, each controller can save the buffered packet data in the external storage device, to prevent the loss of the buffered packet data.

In one example of the present disclosure, a controller that controls a driving device to be controlled includes: a buffer, a communication module for performing packet communication with one or more other controllers; a packet monitor module for buffering packet data generated in the controller and packet data received by the one or more other controllers in the buffer; and a stop module for stopping, in response to a predetermined stop condition being satisfied, a buffering function of the packet monitor module for the controller or a controller specified from the one or more other controllers.

According to this disclosure, each controller can stop not only the buffering function in its own controller, but also the buffering function in another controller. Thus, not only the loss of packet data buffered in its own controller, but also the loss of packet data buffered in the another controller can be prevented.

In one example of the present disclosure, a method of controlling a controller that controls a driving device to be controlled includes: performing packet communication with one or more other controllers; buffering packet data generated in the controller and packet data received by the one or more other controllers in a buffer of the controller; and stopping, in response to a predetermined stop condition being satisfied, the buffering for the controller or a controller specified from the one or more other controllers.

According to this disclosure, each controller can stop not only the buffering function in its own controller, but also the buffering function in another controller. Thus, not only the loss of packet data buffered in its own controller, but also the loss of packet data buffered in the another controller can be prevented.

BRIEF DESCRIPTION OF DRAWINGS

FIG. 5 shows a setting screen which is an example user interface provided by the development tool.

FIG. 6 is a sequence diagram showing a flow of data among controllers when a stop condition is satisfied.

FIG. 7 is a conceptual diagram schematically showing operation modes of the controllers when the stop condition is satisfied.

FIG. 9 shows an event log screen which is an example user interface provided by the development tool.

FIG. 12 shows a collection result screen according to a variation.

FIG. 18 shows common industrial protocol (CIP) parameters for making settings for the packet monitor module.

FIG. 19 shows GIP parameters for specifying an instruction to execute the packet monitor module.

FIG. 20 shows a CIP parameter for acquiring a current state of the packet monitor module.

DESCRIPTION OF EMBODIMENTS

Embodiments according to the present invention will be described hereinafter with reference to the drawings. In the following description, like reference signs indicate like parts and components, and such parts and components have the same names and functions. Accordingly, detailed description thereof is not repeated.

<A. Application>

Figure 1:
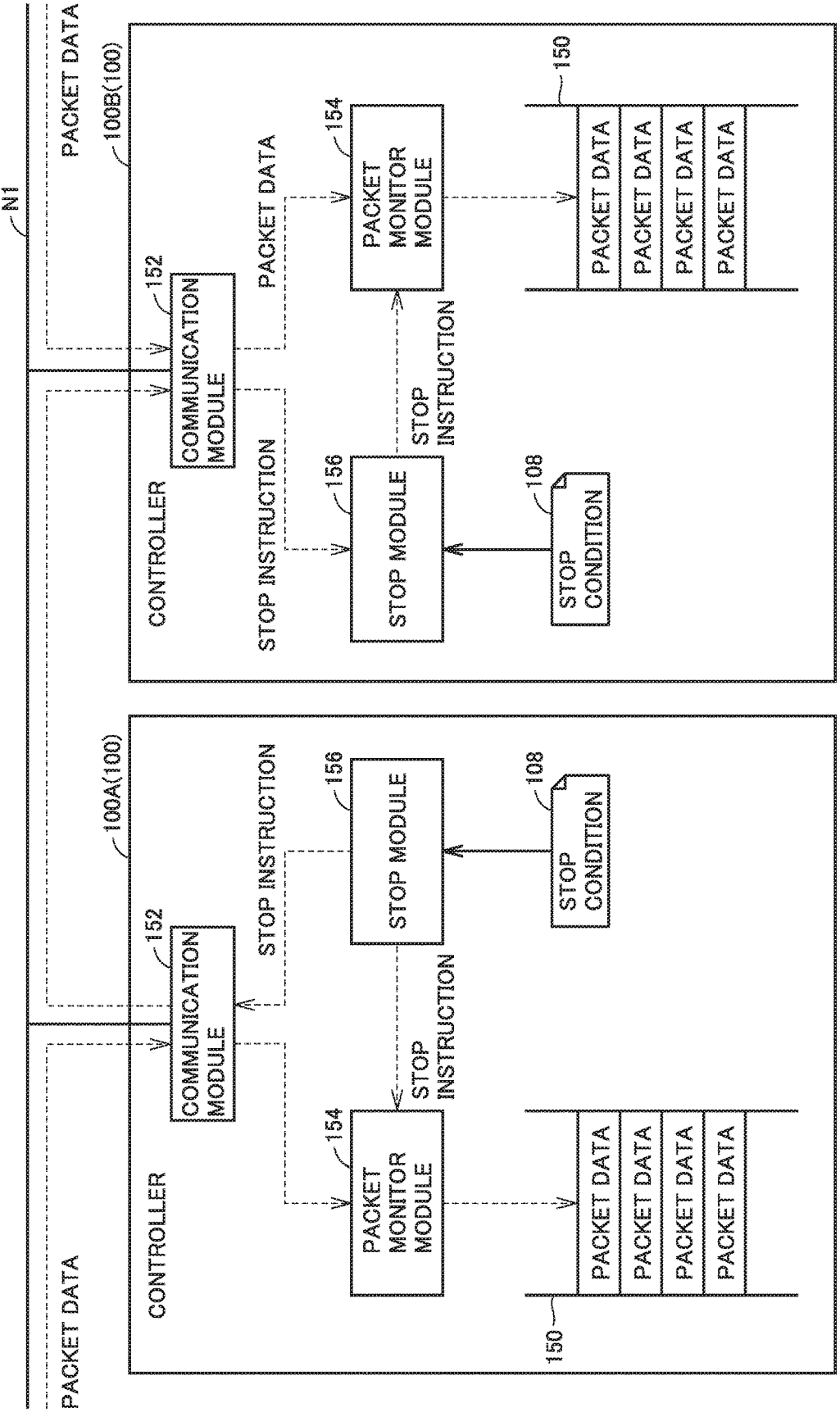
FIG. 1 shows an overview of an FA system according to an embodiment.

An application of the present invention is described with reference to FIG. 1. FIG. 1 shows an overview of an FA system 10.

FA system 10 is a system for controlling an object, such as equipment and an apparatus, to automate a manufacturing process. FA system 10 includes a plurality of controllers. Two controllers 100A and 100B are shown in FIG. 1 as an example of the plurality of controllers. The plurality of controllers are hereinafter also collectively referred to as controller(s) 100.

Controllers 100A and 100B may be connected to a same network Network N1 employs EtherNet/IP (registered trademark), for example.

Controllers 100A and 100B each include a buffer 150, a communication module 152, a packet monitor module 154, and a stop module 156.

Buffer 150 is a volatile storage area in controller 100, for example. In one example, buffer 150 is a storage area such as a random access memory (RAM) or a cache memory.

Communication module 152 is a functional module for implementing communication with another communication device by packet communication. The "another communication device" is a concept that includes any appropriate communication device excluding its own controller. For example, the another communication device includes another controller, a driving device 300 to be controlled by its own controller (see FIG. 2), and an information processing terminal such as a server connected to a controller.

Packet monitor module 154 is a functional module for capturing transmitted and received packet data. More specifically, packet monitor module 154 sequentially buffers packet data generated in its own controller and packet data received by its own controller from another communication device in buffer 150, for transmission to another communication device. Buffer 150 is limited in size, and packet monitor module 154 manages buffer 150 in a First In First Out (FIFO) mode or a Last In First Out (LIFO) mode.

The "packet data" is a concept that includes any appropriate communication data of a certain size transmitted via controller 100. Examples of the packet data include communication data generated in accordance with a communication protocol of EtherNet/IP, communication data generated in accordance with a communication protocol of EtherNet (registered trademark), communication data generated in accordance with a communication protocol of EtherCAT, communication data generated in accordance with a communication protocol of CompoNet (registered trademark), and communication data generated in accordance with a communication protocol of Object Linking and Embedding for Process Control Unified Architecture (OPC-UA).

Stop module 156 is a functional module for stopping the function of buffering the packet data by packet monitor module 154. More specifically, in response to a predetermined stop condition 108 being satisfied, stop module 156 stops the buffering function of packet monitor module 154 for a controller specified from controllers connected to network N1. Stop condition 108 is satisfied, for example, in response to the occurrence of an error in its own controller. Stop condition 108 will be described later in detail.

When its own controller is specified as a stop target, stop module 156 outputs a stop instruction to stop the buffering function to packet monitor module 154 of its own controller. In response to accepting the stop instruction, packet monitor module 154 stops the process of buffering the packet data.

In contrast, when another controller is specified as a stop target, stop module 156 generates an instruction to stop the buffering function, and transmits the stop instruction to the another controller via communication module 152. The another controller that has received the stop instruction stops the function of buffering the packet data.

Since buffer 150 has a limited capacity, some of the packet data in buffer 150 is deleted when buffer 150 is overflown. FA system 10 according to the present embodiment can stop not only the buffering function in its own controller, but also the buffering function in another controller. Thus, not only the loss of packet data buffered in its own controller, but also the loss of packet data buffered in the another controller can be prevented.

<B. Apparatus Configuration of FA System 10>

Figure 2:
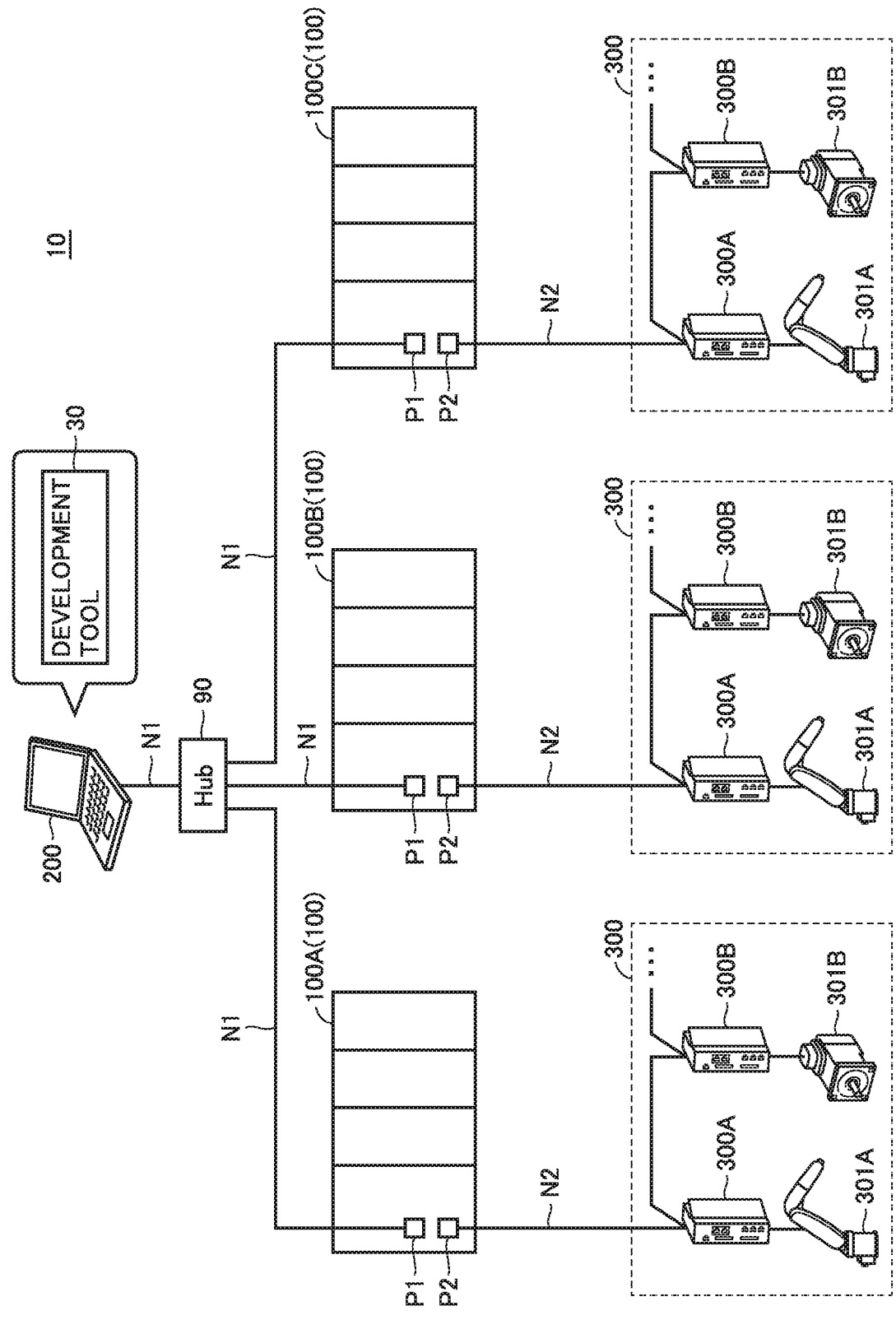
FIG. 2 schematically shows an apparatus configuration of the FA system according to the embodiment.

An example apparatus configuration of FA system 10 is described with reference to FIG. 2. FIG. 2 schematically shows the apparatus configuration of FA system 10.

FA system 10 includes one or more controllers 100, one or more development support devices 200, and one or more driving devices 300. In the example of FIG. 2, three controllers 100A to 100C and one development support device 200 are illustrated.

Controller 100 has a plurality of physical communication ports. A different network may be connected to each communication port. In the example of FIG. 2, controller 100 has two communication ports P1 and P2. Network. N1 is connected to communication port P1. A network N2 is connected to communication port P2.

Controller 100 and development support device 200 are connected to network N1 via a hub 90. Additionally, any appropriate information processing device may be connected to network N1. In one example, a display such as a human machine interface (HMI) or a server device may be connected to network N1.

Examples of development support device 200 include a notebook personal computer (PC), a desktop PC, a tablet terminal, and a smartphone. A development tool 30 may be installed in development support device 200. Development tool 30 is an application for supporting the development of a control program for controller 100. Examples of development tool 30 include "Sysmac Studio" manufactured by OMRON Corporation. A user can design a control program for controller 100 on development tool 30, and install the designed control program in controller 100. The created control program is transmitted to controller 100 as an executable file compiled by development support device 200.

Lower-level network N2 preferably employs a field network that performs fixed-cycle communication, which guarantees a data arrival time. Known examples of such a field network that performs fixed-cycle communication include EtherCAT and CompoNet. Controller 100 controls driving device 300 to be controlled in accordance with the control program created on development support device 200.

Driving device 300 is a collection of devices for directly or indirectly performing prescribed work on a workpiece. In the example of FIG. 2, driving device 300 includes a robot controller 300A, a servo driver 300B, an arm robot 301A controlled by robot controller 300A, a servo motor 301B controlled by servo driver 300B, and the like. Driving device 300 may also include a vision sensor for taking an image of the workpiece, and any other device used in the manufacturing process.

<C. Functions of FA System 10>

FA system 10 typically has the following setting functions A to C.

(Function A) Function of accepting, by development support device 200, various settings for packet monitor module 154 (see FIG. 1).

(Function B) Function of switching, by each controller, operation modes of packet monitor modules 154 of its own controller and another controller in accordance with the settings accepted in the function (a).

(Function C) Function of collecting, by development support device 200, packet data that has been buffered by packet monitor module 154 of each controller.

In a typical usage example, these functions A to C are sequentially executed.

These functions A to C will be hereinafter described in order.

[C1. Setting Function]

Figure 3:
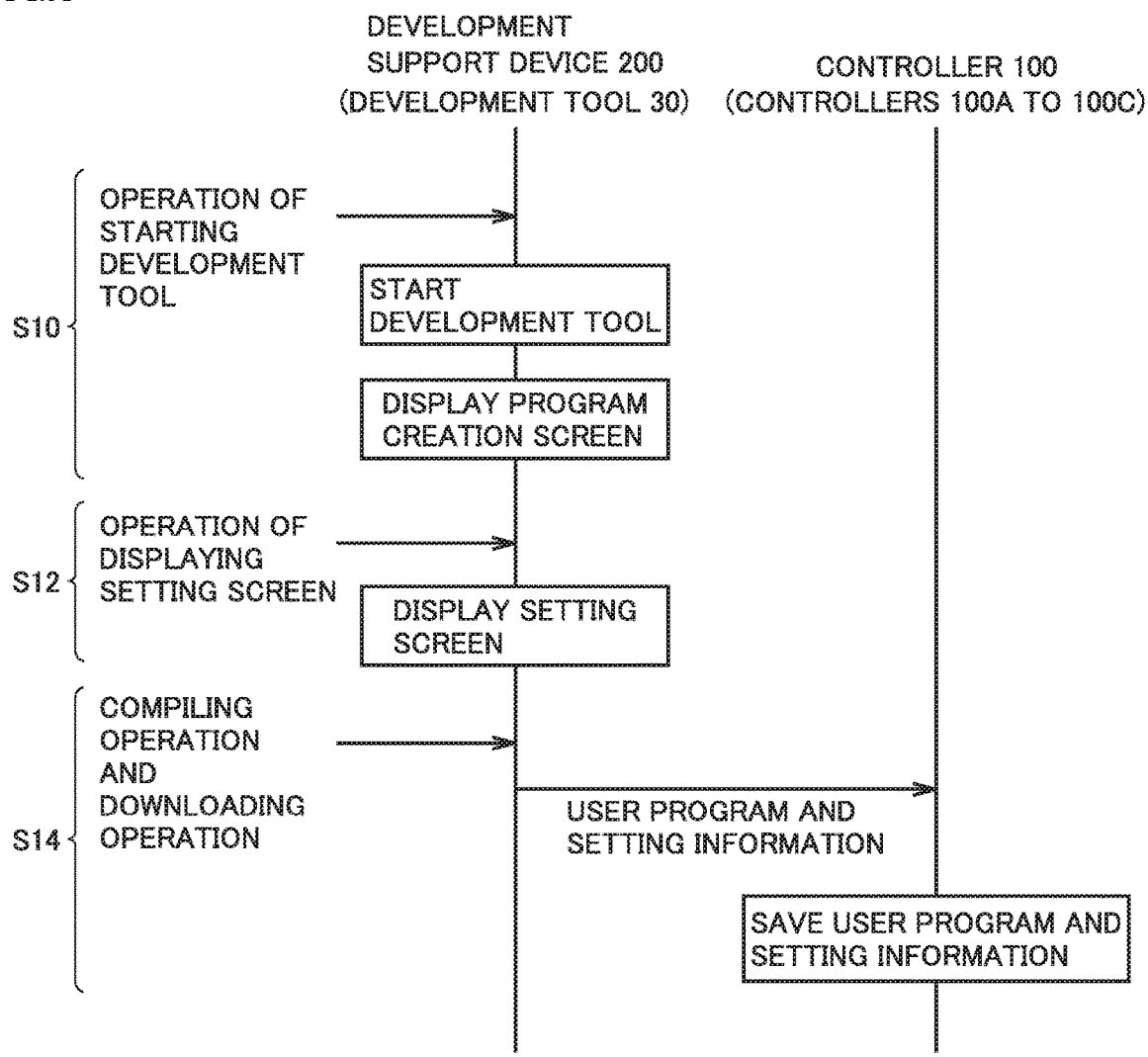
FIG. 3 is a sequence diagram showing a flow of a setting process for a packet monitor module.

Function A of FA system 10 is initially described with reference to FIGS. 3 to 5. FIG. 3 is a sequence diagram showing a flow of a setting process for packet monitor module 154 (see FIG. 1).

It is assumed that, in step S10, development support device 200 accepts operation of starting development tool 30. In response, development support device 200 displays a program creation screen. FIG. 4 shows a program creation screen 31 which is an example user interface provided by development tool 30. Program creation screen 31 is displayed on, for example, a display 221 of development support device 200.

The user can develop a control program for controller 100 on program creation screen 31. FIG. 4 shows a user program 210 which is an example control program for controller 100. User program 210 may be written in any programming language. In one example, user program 210 may be defined in a ladder diagram (LD), or is defined in any of an instruction list (IL), a structured text (ST), and a sequential function chart (SFC), or a combination of them. Alternatively, user program 210 may be defined in a general-purpose programming language such as JavaScript (registered trademark) or C language.

Figure 4:
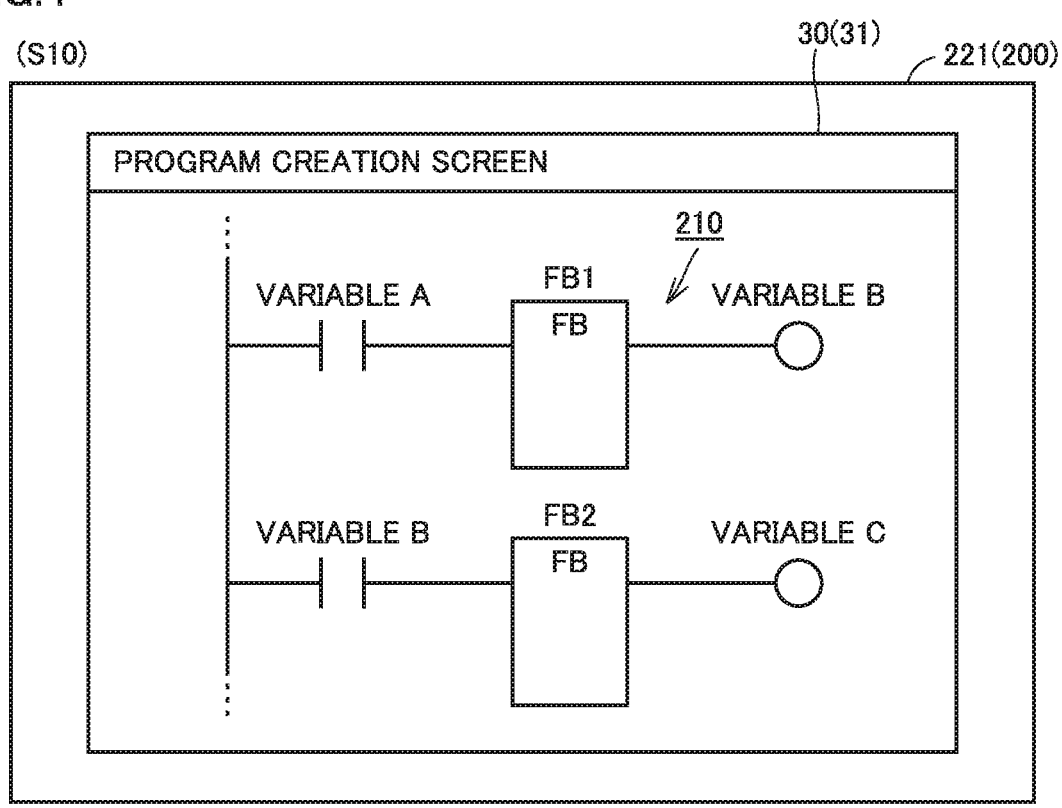
FIG. 4 shows a program creation screen which is an example user interface provided by a development tool.

In the example of FIG. 4, user program 210 is written in a ladder diagram. A designer can design user program 210 suitable for driving device 300 to be controlled, by combining any appropriate function blocks or defining input-output relations of variables and function blocks on program creation screen 31. The function block is a function that is repeatedly used in user program 210 and that has been made into a component.

In the example of FIG. 4, user program 210 includes variables "A" to "C" and function blocks FB1, FB2. Function block FB1 executes, based on a value of the variable "A" associated with its input unit, a predetermined function defined in function block FB1. A result of the execution is reflected in the variable "B" associated with an output unit of function block FB1. Function block FB2 executes, based on a value of the variable "B" associated with its input unit, a predetermined function defined in function block FB2. A result of the execution is reflected in the variable "C" associated with an output unit of function block FB2. In this manner, the designer can design any appropriate user program 210 by combining the variables and function blocks on program creation screen 31.

Development tool 30 provides various function blocks. In one example, above-described stop module 156 (see FIG. 1) for stopping the function of buffering the packet data is provided as a function block. Additionally, a start module for starting execution of the function of buffering the packet data is provided as a function block. Additionally, a save module for saving the packet data buffered in buffer 150 in an external storage device (for example, a memory card) is provided as a function block.

Referring again to FIG. 3, it is assumed that, in step S12, development tool 30 invokes a setting screen for making various settings for packet monitor module 154 (see FIG. 1). In response, the setting screen is displayed on display 221 of development support device 200.

FIG. 5 shows a setting screen 33 which is an example user interface provided by development tool 30. Setting screen 33 is a user interface that accepts various settings for packet monitor module 154.

As shown in FIG. 5, setting screen 33 includes setting columns 41, 42, 45, 47, a save button 50, and a cancel button 51. The settings input to setting screen 33 set a condition for starting the process of buffering the packet data, a condition for stopping the process of buffering the packet data, a condition for saving the packet data, a condition for transferring the packet data, and the like.

More specifically, setting column 41 accepts a setting for specifying an operation mode of packet monitor module 154. Examples of the specifiable operation mode include "start," "stop," "save" and "transfer." In one example, the specifiable operation modes are listed in response to a button 41A being pressed. The user can select one operation mode from the displayed list of operation modes, to specify the operation mode of packet monitor module 154.

Setting column 42 accepts a setting for specifying an execution condition. In setting column 42, for example, an error type of an event log that may occur in controller 100, an error type indicated by packet data, and the like may be specified. Candidates for the execution condition that can be specified in setting column 42 are typically defined in advance. For example, the candidates for the specifiable execution condition are listed in response to a button 42A being pressed. The user can select one execution condition from the displayed list of execution condition candidates, to specify the execution condition.

In the following, an execution condition with "start" specified in setting column 41 is also referred to as a "start condition." An execution condition with "stop" specified in setting column 41 is also referred to as a "stop condition," An execution condition with "save" specified in setting column 41 is also referred to as a "save condition," An execution condition with "transfer" specified in setting column 41 is also referred to as a "transfer condition."

Setting column 45 accepts a setting for specifying a controller for which the instruction is intended. The controller for which the instruction is intended may be selected from among predetermined candidates, or may be specified by input of identification information (for example, a controller name or an IP address) on the controller. In one example, candidates for the controller that can be specified as the controller for which the instruction is intended are listed in response to a button 45A being pressed. The user can select one controller from the displayed list of controller candidates, to specify the controller for which the instruction is intended.

In response to the execution condition specified in setting column 42 being satisfied, controller 100 causes packet monitor module 154 of the controller specified in setting column 45 to operate in the operation mode specified in setting column 41.

In one example, when the start condition is satisfied, controller 100 causes the controller for which the instruction is intended and which is associated with the start condition to start executing packet monitor module 154.

When the stop condition is satisfied, controller 100 causes the controller for which the instruction is intended and which is associated with the stop condition to stop packet monitor module 154. The stop condition corresponds to above-described stop condition 108 (see FIG. 1).

When the save condition is satisfied, controller 100 causes the controller for which the instruction is intended and which is associated with the save condition to save the buffered packet data in its own controller.

When the transfer condition is satisfied, controller 100 causes the controller for which the instruction is intended and which is associated with the transfer condition to transfer the buffered packet data to a specified destination.

Setting column 47 accepts a setting for specifying ON/OFF of a notification function. When ON is specified in setting column 47, a notification of the occurrence of an error is provided when the execution condition specified in setting column 42 is satisfied. The notification of the occurrence of an error may be provided by sound such as an alarm, or by a displayed message and the like. When OFF is specified in setting column 47, a notification of the occurrence of an error is not provided even when the execution condition specified in setting column 42 is satisfied.

When save button 50 is pressed, development support device 200 saves setting information 212 that has been input to setting screen 33. When cancel button 51 on setting screen 33 is pressed, development support device 200 closes setting screen 33 without saving setting information 212 that has been input to setting screen 33.

Referring again to FIG. 3, it is assumed that, in step S14, development tool 30 accepts compiling operation. In response, development tool 30 compiles user program 210 created on program creation screen 31. It is assumed that development tool 30 then accepts operation of downloading a result of the compilation. In response, development tool 30 transfers setting information 212 stored in step S12 together with compiled user program 210 to controller 100. Controller 100 saves received user program 210 and setting information 212 in an internal storage device.

[C2. Function of Stopping Packet Monitor Module 154]

An example of function B of FA system 10 is now described with reference to FIGS. 6 and 7. FIG. 6 is a sequence diagram showing a flow of data among controllers 100A to 100C when stop condition 108 is satisfied. FIG. 7 is a conceptual diagram schematically showing operation modes of controllers 100A to 100C when stop condition 108 is satisfied.

Step numbers shown in FIG. 6 correspond to step numbers shown in FIG. 7.

It is assumed that, in step S30A, controller 100A is started. In response, controller 100A starts executing the packet monitoring function of packet monitor module 154.

It is assumed that, in step S30B, controller 100B is started. In response, controller 100 starts executing the packet monitoring function of packet monitor module 154.

It is assumed that, in step S30C, controller 100C is started. In response, controller 100C starts executing the packet monitoring function of packet monitor module 154.

It is assumed that, in step S31A, controller 100A accepts an instruction to execute user program 210 stored in its own controller. In response, controller 100A starts executing user program 210.

It is assumed that, in step S31B, controller 100B accepts an instruction to execute user program 210 stored in its own controller. In response, controller 100B starts executing user program 210.

It is assumed that, in step S31C, controller 100C accepts an instruction to execute user program 210 stored in its own controller. In response, controller 100C starts executing user program 210.

In step S32, controller 100A determines whether or not any of the execution conditions defined in setting information 212 has been satisfied. It is assumed, for example, that the stop condition which is an example of the execution conditions has been satisfied. In this case (YES in step S32), controller 100A switches control to step S34. When it is determined that none of the execution conditions defined in setting information 212 has been satisfied (NO in step S32), controller 100A executes the process of step S32 again.

In one example, it is assumed that controllers 100A to 100C have been specified as controllers for which the instruction is intended. In this case, controller 100A stops the process of buffering the packet data in its own controller, and the process of buffering the packet data in other controllers 100B and 100C.

More specifically, in step S34, stop module 156 of controller 100A stops the buffering function of packet monitor module 154 in its own controller. Accumulation of the packet data in buffer 150 of controller 100A is thus stopped.

In step S36, stop module 156 of controller 100A generates an instruction to stop the buffering function, and transmits the stop instruction to other controllers 100B and 100C. In response to receiving the stop instruction from controller 100A, stop module 156 of controller 100B stops the buffering function of packet monitor module 154 of controller 100B. Accumulation of the packet data in buffer 150 of controller 100B is thus stopped. Likewise, in response to receiving the stop instruction from controller 100A, stop module 156 of controller 100C stops the buffering function of packet monitor module 154 of controller 100C. Accumulation of the packet data in buffer 150 of controller 100C is thus stopped.

In this manner, controller 100 has the function of stopping the buffering functions of its own controller and the other controllers in response to the predetermined stop condition being satisfied. Preferably, the buffering functions of its own controller and the other controllers are simultaneously or substantially simultaneously stopped. Thus, each controller can leave in buffer 150 packet data buffered in the same period of time.

[C3. Process of Collecting Packet Data]

Figure 8:
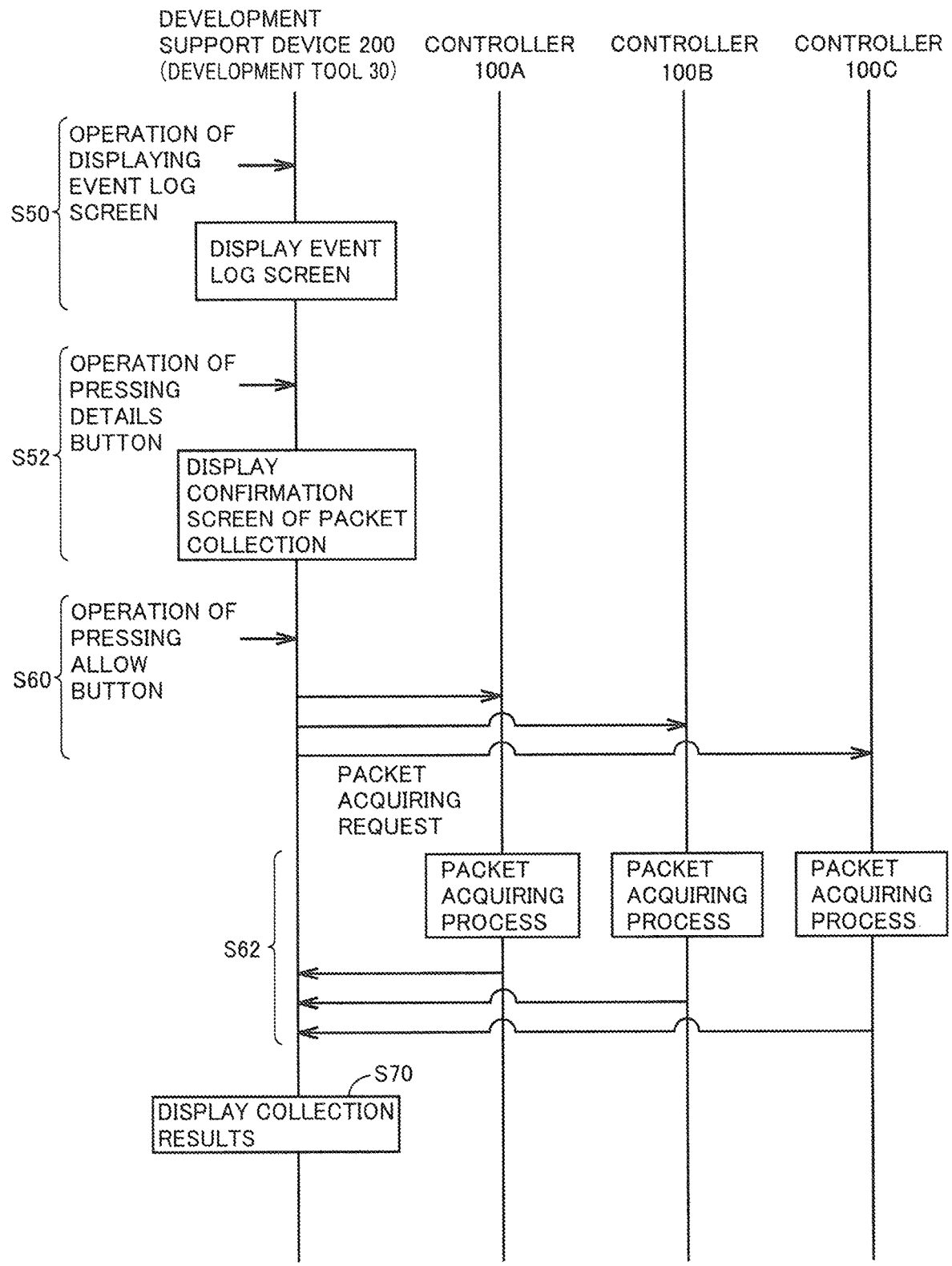
FIG. 8 is a sequence diagram showing a flow of a process of collecting buffered packet data from each controller.

Function C of FA system 10 is now described with reference to FIGS. 8 to 11. FIG. 8 is a sequence diagram showing a flow of a process of collecting the buffered packet data from each controller.

It is assumed that, in step S50, development support device 200 accepts operation of displaying an event log screen. In response, development support device 200 displays the event log screen. FIG. 9 shows an event log screen 35 which is an example user interface provided by development tool 30. Event log screen 35 is displayed on, for example, display 221 of development support device 200.

Development support device 200 displays event logs collected from each controller 100 on event log screen 35. Event log screen 35 has display columns 60 to 65. Display column 60 displays the importance of an occurring error. Display column 61 displays a communication protocol in which the error has occurred. Display column 62 displays a communication port where the error originated. Display column 63 displays an event name. Display column 64 displays an event code. Display column 65 displays a details button.

Figure 10:
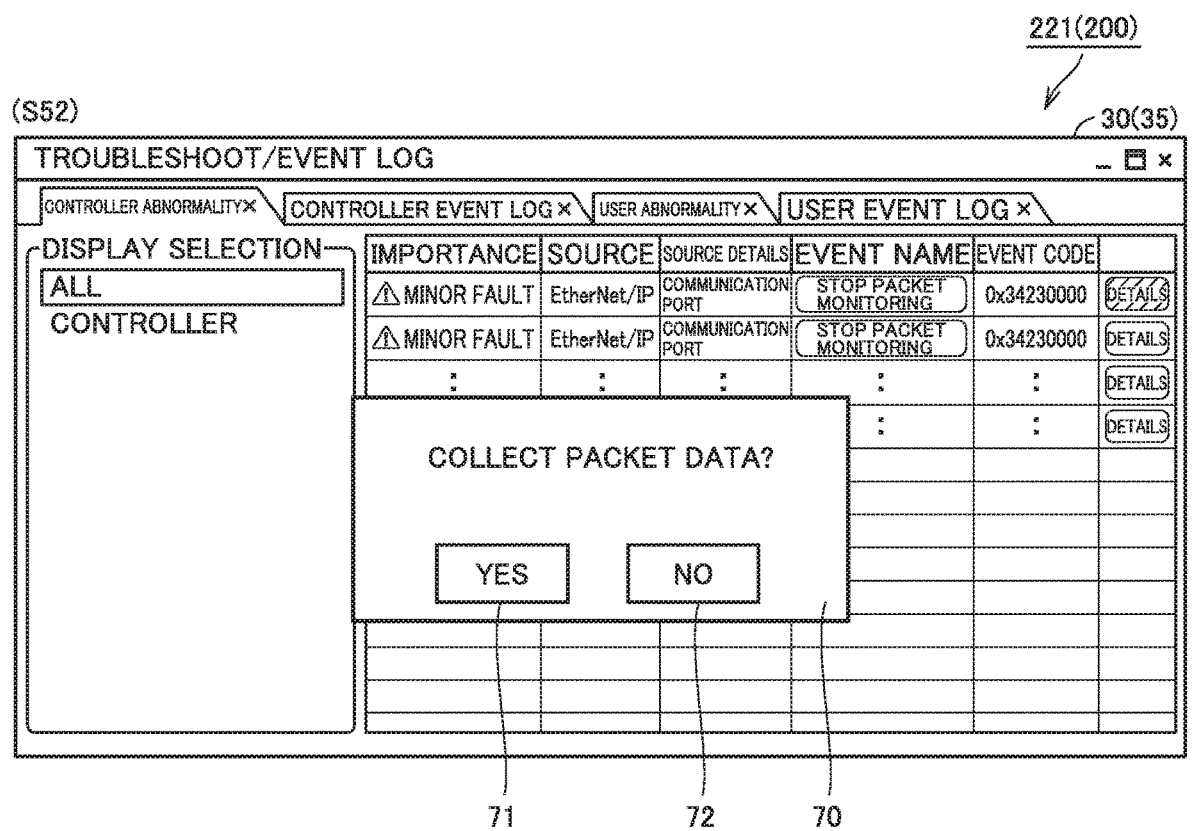
FIG. 10 shows a confirmation screen which is an example user interface provided by the development tool.

Referring again to FIG. 8, in step S52, in response to one of the details buttons displayed in display column 65 being pressed, development support device 200 displays a confirmation screen for accepting a determination of whether or not to start the packet collection. FIG. 10 shows an example confirmation screen.

FIG. 10 shows a confirmation screen 70 as an example confirmation screen. Confirmation screen 70 has a button 71 indicating "YES" and a button 72 indicating "NO". When button 71 indicating "YES" is pressed, development support device 200 starts collecting the packet data in each controller 100. When button 72 indicating "NO" is pressed, development support device 200 simply closes confirmation screen 70.

Referring again to FIG. 8, in step S60, in response to button 71 indicating "YES" on confirmation screen 70 being pressed, development support device 200 transmits a request to acquire packet data to each of specified controllers 100A to 100C.

In step S62, controllers 100A to 100C each acquire the packet data stored in buffer 150 (see FIG. 1) of its own controller, and transmit the packet data to development support device 200.

Figure 11:
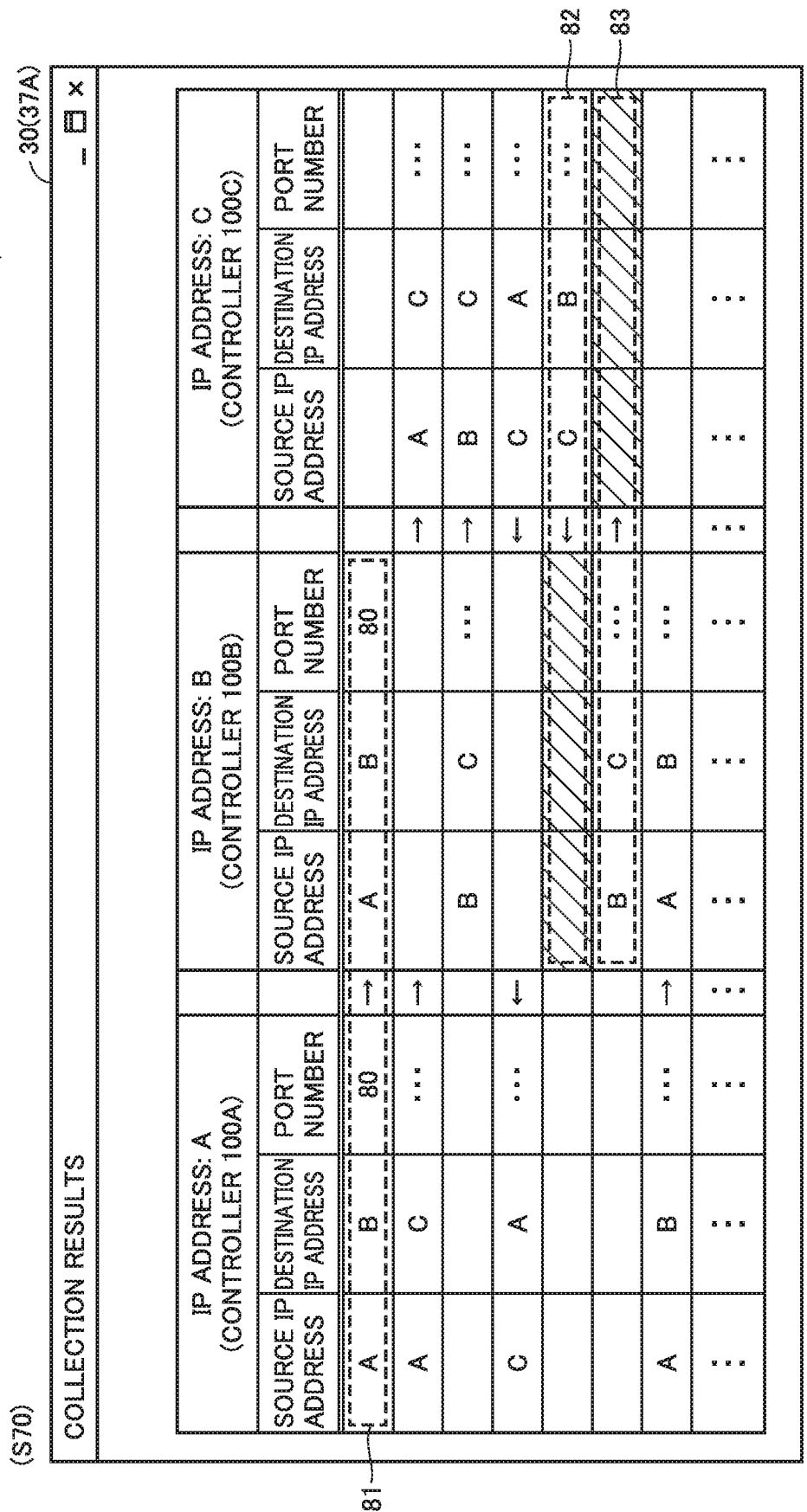
FIG. 11 shows a packet data collection result screen which is an example user interface provided by the development tool.

In step S70, development support device 200 displays a result of the collection of the packet data collected from each of controllers 100A to 100C. FIG. 11 shows a packet data collection result screen 37A which is an example user interface provided by development tool 30.

Packet data in accordance with EtherCAT, EtherNet, EtherNet/IP and the like includes an EtherNet header. This EtherNet header includes source information (for example, an IP address) for identifying a source controller, and destination information (for example, an IP address) for identifying a destination controller. Additionally, the packet data includes information such as a destination port number.

Based on the information defined in the packet data, collection result screen 37A displays the source IP address and the destination IP address for each collected packet data. A record of packet data remains in both a source controller and a destination controller, Therefore, if a pair of records does not remain in controllers, it means that the packet data has been lost for some reason. The display of the source IP address and the destination IP address for each packet data allows the user to easily determine which packet data has been lost in which controller, thereby facilitating analysis of a communication error.

Preferably, collection result screen 37A displays packet data having matching source information and matching destination information in a corresponding manner. In the example of FIG. 11, these packet data pieces are displayed in a row. For example, as indicated in a broken line portion 81, a record of packet data transmitted from controller 100A having an IP address of "A" to controller 100B having an IP address of "B" remains in both controller 100A and controller 100B. Development support device 200 displays these corresponding packet data pieces collected from controller 100A and controller 100B side by side. This allows the user to more easily find out which packet data has been lost in which controller, thereby further facilitating the analysis of a communication error.

Preferably, collection result screen 37A displays packet data, in which a pair of packet data having matching source information and matching destination information does not exist, in a display mode different from other packet data. That is, packet data in which a pair of packet data does not exist is highlighted. The highlighting is implemented by, for example, hatched display, display with a particular color (for example, red), or blinked display. In the example of FIG. 11, the highlighting is implemented by hatched display (broken line portions 82 and 83). The highlighting of the packet data in which a pair of packet data does not exist allows the user to immediately find out which packet data has been lost.

Packet data collection result screen 37A is not limited to the example of FIG. 11. FIG. 12 shows a collection result screen 37B, which is a variation of collection result screen 37A. As shown in FIG. 12, collection result screen 37B has a search condition input area 85 and a search result display area 86.

Search condition input area 85 accepts various conditions for searching for packet data. In one example, input area 85 accepts identification information on a controller as the search condition. The search condition that can be specified in input area 85 is not limited to the identification information on a controller. In one example, a communication protocol, a port number or the like may be input as the search condition.

In response to the search condition being input to input area 85, development support device 200 searches the collected packet data for packet data that matches the specified search condition, and lists the packet data that matches the specified search condition in search result display area 86. As a search result, for example, an IP address of a source controller, an IP address of a destination controller, a communication protocol that was used for communication, a destination port number, and remarks are displayed.

<D. Function of Saving Packet Data>

Figure 13:
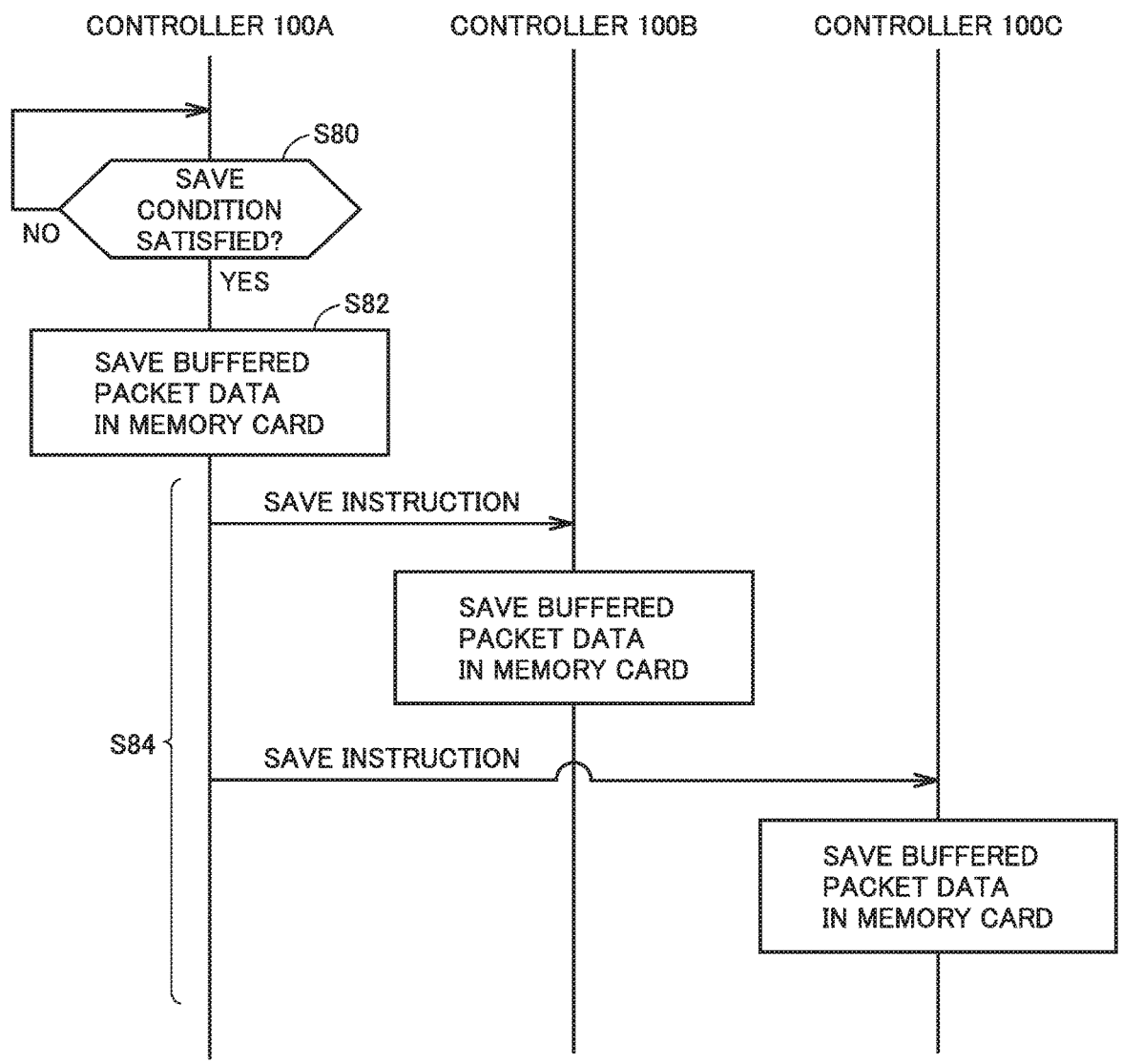
FIG. 13 is a sequence diagram showing a control flow when a function of saving packet data is executed.

A saving function of saving the buffered packet data is described with reference to FIG. 13. FIG. 13 is a sequence diagram showing a control flow when the function of saving the packet data is executed.

In step S80, controller 100A determines whether or not the save condition defined in setting information 212 (see FIG. 5) has been satisfied. When it is determined that the save condition defined in setting information 212 has been satisfied (YES in step S80), controller 100A switches control to step S82. Otherwise (NO in step S80), controller 100A executes the process of step S80 again.

Controllers for which the instruction is intended are associated with the save condition defined in setting information 212. In one example, it is assumed that controllers 100A to 100C are associated, as controllers for which the instruction is intended, with the save condition. In this case, controller 100A executes a process of saving the packet data buffered in its own controller, and a process of saving the packet data buffered in other controllers 100B and 100C.

More specifically, in step S82, controller 100A saves the packet data buffered in buffer 150 of its own controller in an external storage device (for example, a memory card 140 described later). Thus, the packet data in controller 100A is saved as log data.

In step S84, controller 100A generates an instruction to save the packet data, and transmits the save instruction to other controllers 100B and 100C. In response to receiving the save instruction from controller 100A, controller 100B saves the packet data buffered in buffer 150 of controller 100B in the external storage device (for example, memory card 140 described later). Thus, the packet data in controller 100B is saved in the external storage device. Likewise, in response to receiving the save instruction from controller 100A, controller 100C saves the packet data buffered in buffer 150 of controller 100C in the external storage device (for example, memory card 140 described later). Thus, the packet data in controller 100C is saved in the external storage device.

<E. Function of Starting Buffering Process>

Figure 14:
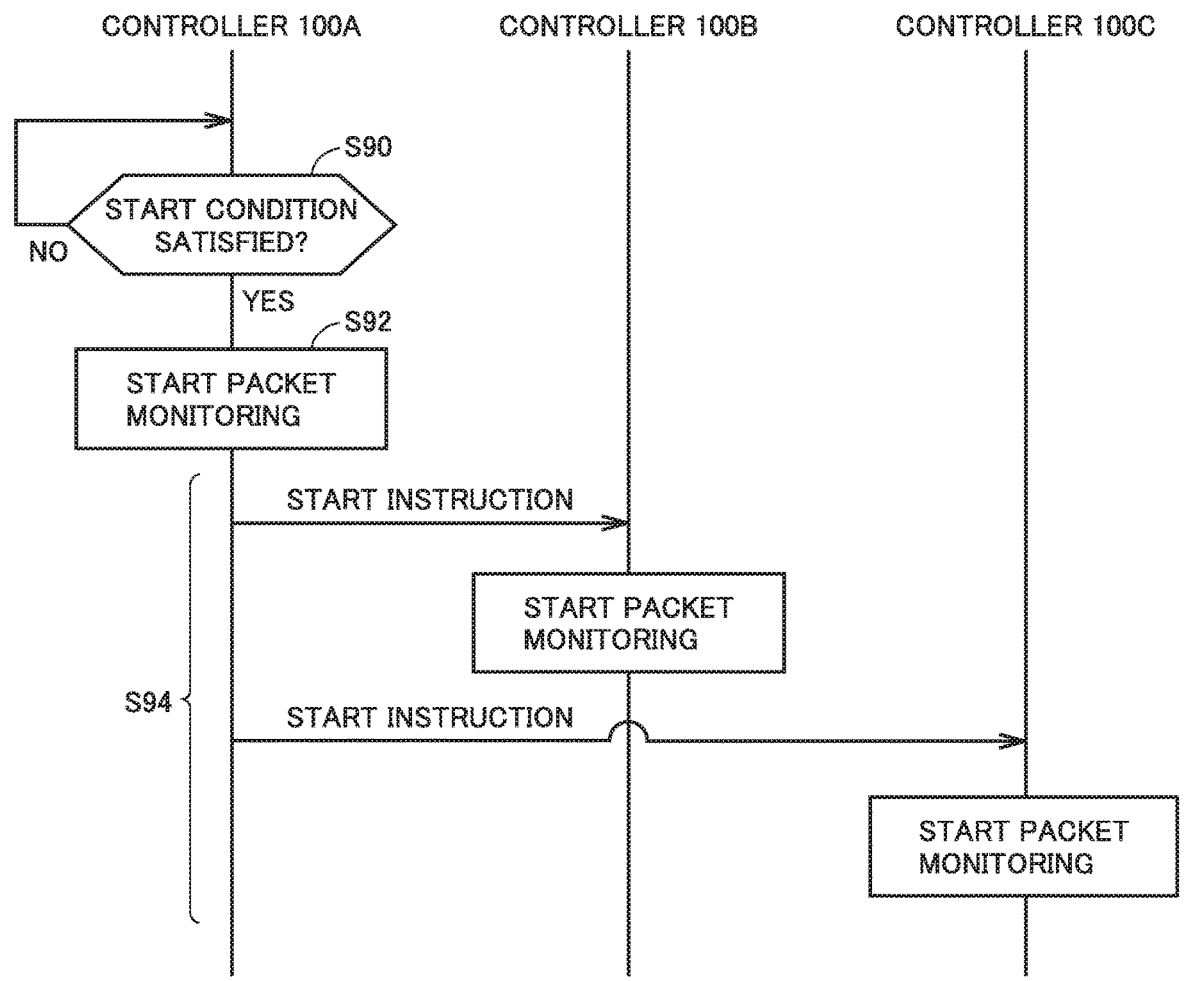
FIG. 14 is a sequence diagram showing a control flow when a function of starting a buffering process by a packet monitor module is executed.

A starting function of causing packet monitor module 154 to start the buffering process is described with reference to FIG. 14. FIG. 14 is a sequence diagram showing a control flow when the function of starting the buffering process by packet monitor module 154 is executed.

In step S90, controller 100A determines whether or not the start condition defined in setting information 212 (see FIG. 5) has been satisfied. When it is determined that the start condition defined in setting information 212 has been satisfied (YES in step S90), controller 100A switches control to step S92. Otherwise (NO in step S90), controller 100A executes the process of step S90 again.

Controllers for which the instruction is intended are associated with the start condition defined in setting information 212. In one example, it is assumed that controllers 100A to 100C are associated, as controllers for which the instruction is intended, with the start condition. In this case, controller 100A starts a process of buffering the packet data in its own controller, and a process of buffering the packet data in other controllers 100B and 100C.

More specifically, in step S92, controller 100A causes packet monitor module 154 of its own controller to start the buffering function. Thus, the process of buffering the packet data in buffer 150 of its own controller is started.

In step S94, controller 100A generates an instruction to start the buffering function, and transmits the start instruction to other controllers 100B and 100C. In response to receiving the start instruction from controller 100A, controller 100B causes packet monitor module 154 of controller 100B to start the buffering function.

Accumulation of the packet data in buffer 150 of controller 100B is thus started. Likewise, in response to receiving the start instruction from controller 100A, controller 100C causes packet monitor module 154 of controller 100C to start the buffering function. Accumulation of the packet data in buffer 150 of controller 100C is thus started.

In this manner, controller 100 has the function of starting the buffering functions of its own controller and the other controllers in response to the predetermined start condition being satisfied. Preferably, the buffering functions of its own controller and the other controllers are simultaneously or substantially simultaneously started.

<F. Hardware Configuration>

Figure 15:
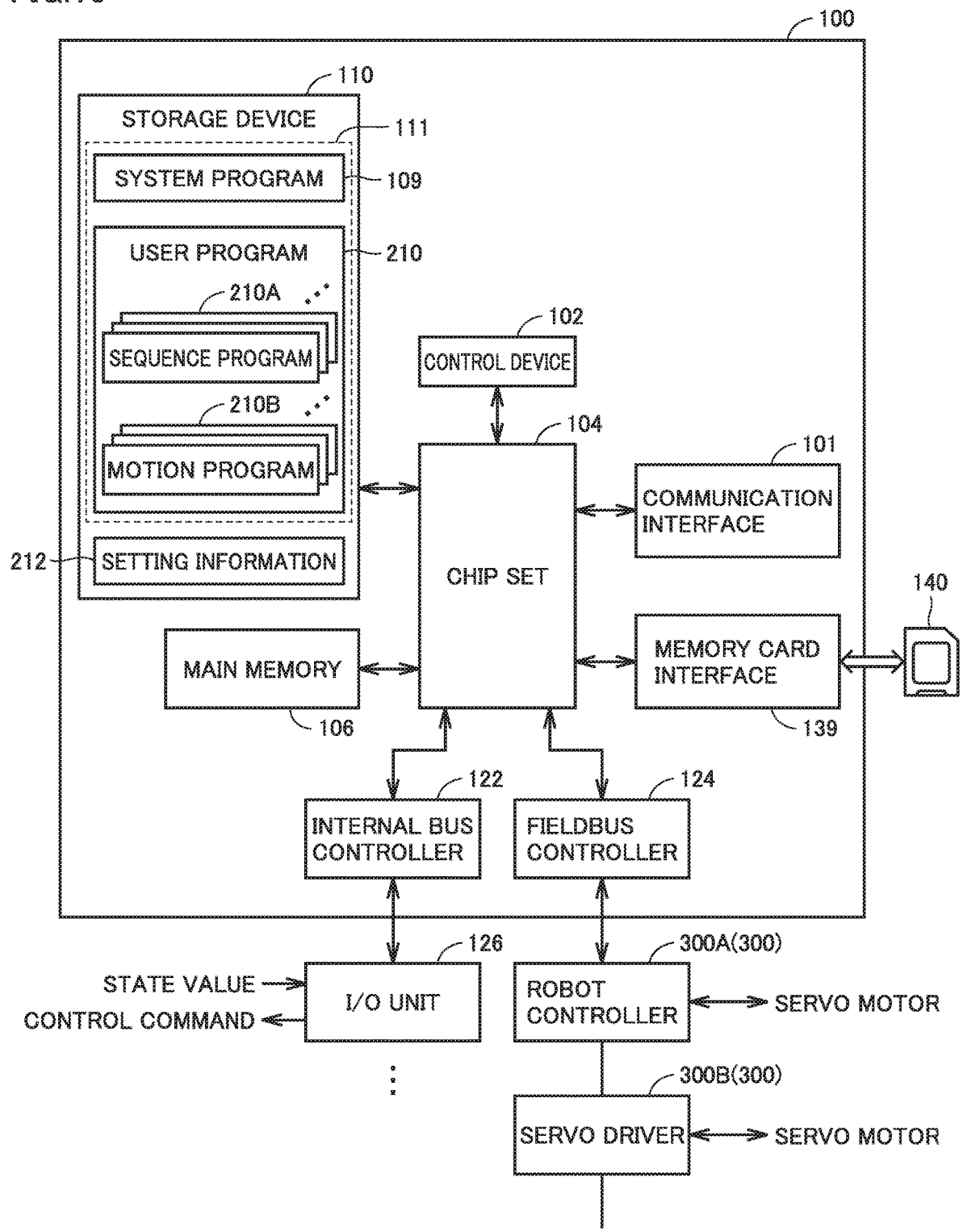
FIG. 15 is a schematic diagram showing an example hardware configuration of the controller according to the embodiment.
Figure 16:
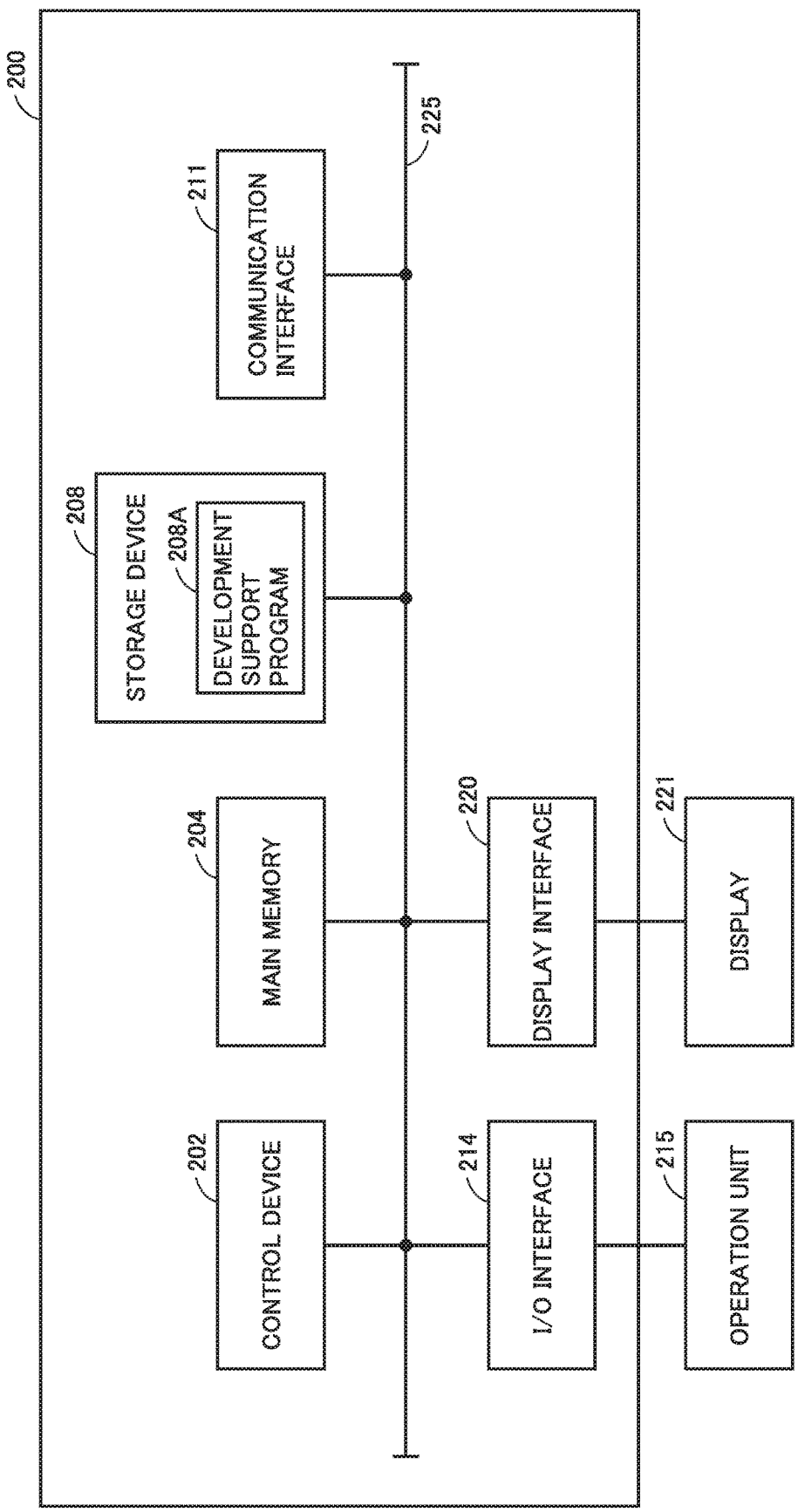
FIG. 16 is a schematic diagram showing a hardware configuration of a development support device according to the embodiment.

Hardware configurations of controller 100 and development support device 200 are described in order with reference to FIGS. 15 and 16.

(F1. Hardware Configuration of Controller 100)

The hardware configuration of controller 100 is initially described with reference to FIG. 15. FIG. 15 is a schematic diagram showing an example hardware configuration of controller 100.

Controller 100 includes a communication interface 101, a control device 102 such as a central processing unit (CPU) or a micro-processing unit (MPU), a chip set 104, a main memory 106, a nonvolatile storage device 110, an internal bus controller 122, a fieldbus controller 124, and a memory card interface 139.

Control device 102 reads a control program 111 stored in storage device 110, and executes control program 111 by deploying it to main memory 106, thereby implementing any appropriate control on driving device 300 to be controlled and the like. Control program 111 includes various programs for controlling controller 100. In one example, control program 111 includes a system program 109, user program 210, and the like. System program 109 includes an instruction code for providing basic functions of controller 100, such as data I/O processing and execution timing control. User program 210 is downloaded from development support device 200. User program 210 is appropriately designed depending on the control target, and includes a sequence program 210A for performing sequence control and a motion program 210B for performing motion control.

Chip set 104 controls each component to implement the process as the entire controller 100.

Storage device 110 stores various types of data in addition to control program 111. In one example, storage device 110 stores above-described setting information 212 (see FIG. 5) and the like.

Internal bus controller 122 is an interface that exchanges data with various devices coupled to controller 100 through an internal bus. As an example of such devices, an I/O unit 126 is connected.

Fieldbus controller 124 is an interface that exchanges data with various driving devices 300 coupled to controller 100 through a fieldbus. As an example of such devices, robot controller 300A and servo driver 300B are connected. Additionally, a driving device such as a vision sensor may be connected.

Internal bus controller 122 and fieldbus controller 124 can provide any appropriate command to the device connected thereto, and also acquire any appropriate data managed by the device. Internal bus controller 122 and/or fieldbus controller 124 also function(s) as an interface for exchanging data with robot controller 300A or servo driver 300B.

Communication interface 101 controls data exchange through various wired/wireless networks. Controller 100 communicates with an external device such as development support device 200 via communication interface 101. Controller 100 performs packet communication with another communication device via communication interface 101.

Memory card interface 139 is an interface unit for connecting memory card 140 (for example, an SD card) which is an example external storage medium. Memory card interface 139 is configured such that memory card 140 can be inserted therein and removed therefrom, and can write data to and read data from memory card 140.

(F2. Hardware Configuration of Development Support Device 200)

The hardware configuration of development support device 200 is now described with reference to FIG. 16. FIG. 16 is a schematic diagram showing the hardware configuration of development support device 200.

In one example, development support device 200 is a computer configured in accordance with a general-purpose computer architecture. Development support device 200 includes a control device 202 such as a CPU or an MPU, a main memory 204, a nonvolatile storage device 208, a communication interface 211, an input/output (I/O) interface 214, and a display interface 220. These components are connected to communicate with one another via an internal bus 225.

Control device 202 executes a development support program 208A stored in storage device 208 by deploying it to main memory 204, thereby implementing various types of control in development tool 30. Development support program 208A is a program for providing a development environment of user program 210. Storage device 208 stores, in addition to development support program 208A, various types of data and the like generated with development tool 30. Examples of the data include above-described user program 210 created on development tool 30, and above-described setting information 212.

Communication interface 211 exchanges data with another communication device via a network. Examples of the another communication device include controller 100, and an external device such as a server. Development support device 200 may be configured to download various programs such as development support program 208A from the another communication device via communication interface 211.

I/O interface 214 is connected to operation unit 215, and captures a signal indicating user operation from operation unit 215. Operation unit 215 is typically a keyboard, a mouse, a touch panel, a touch pad or the like, and accepts operation from the user.

Display interface 220 is connected to display 221, and transmits an image signal for displaying an image to display 221 in accordance with a command from control device 202 and the like. Display 221 is a liquid crystal display (LCD), an organic electro luminescence (EL) display or the like, and presents various types of information to the user. On display 221, various types of screens provided by development tool 30 (for example, above-described program creation screen 31 and setting screen 33) may be displayed. While development support device 200 and display 221 are shown as separated from each other in the example of FIG. 16, development support device 200 and display 221 may be integrally configured.

<G. Functional Configuration>

Figure 17:
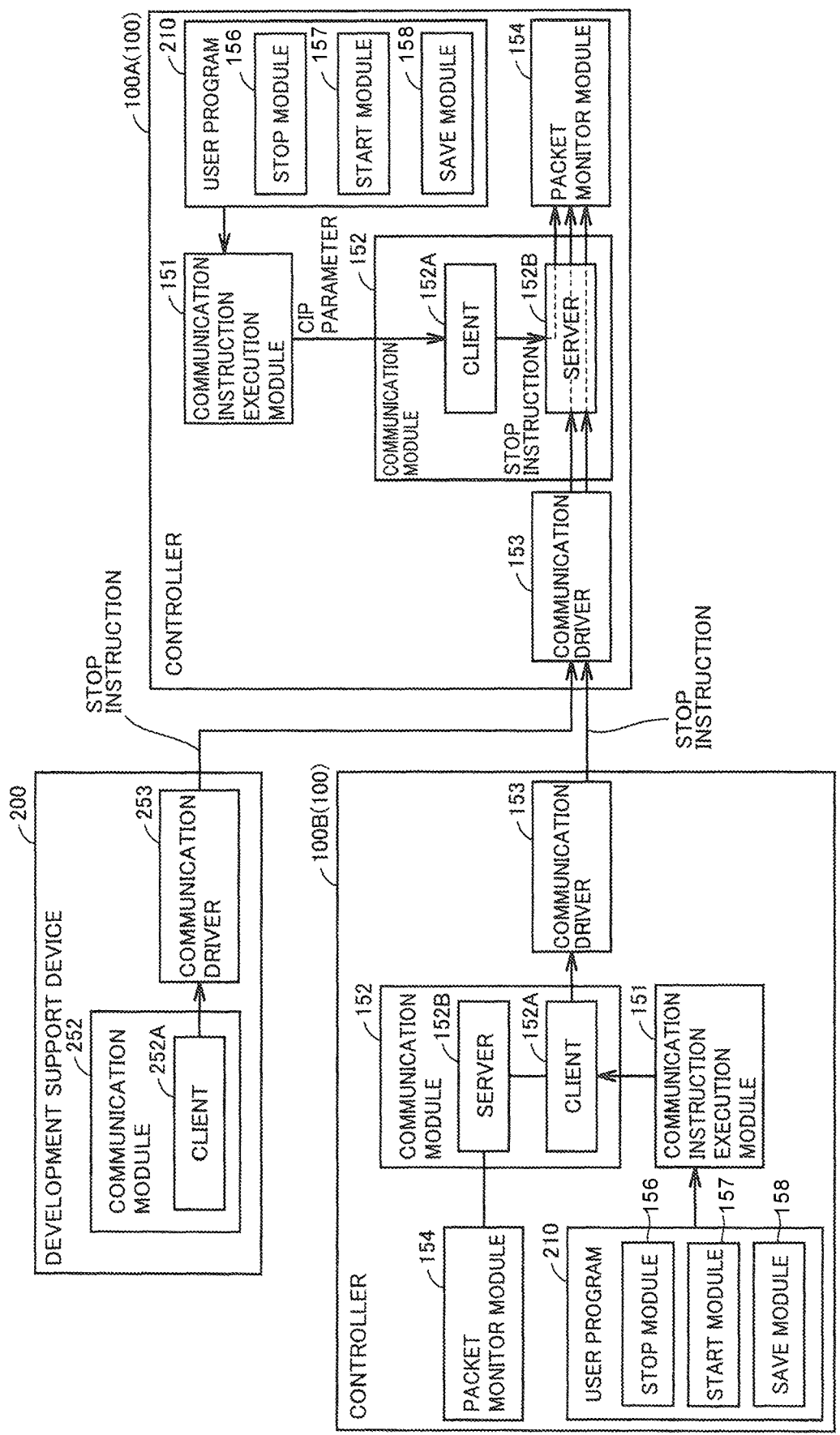
FIG. 17 shows an example functional configuration of the controller and the development support device according to the embodiment.

Functions of controller 100 and development support device 200 are described with reference to FIG. 17. FIG. 17 shows an example functional configuration of controller 100 and development support device 200.

As shown in FIG. 17, controllers 100A and 100B each include, as a functional configuration, a communication instruction execution module 151, communication module 152, a communication driver 153, and packet monitor module 154. These functional modules are implemented in system program 109 (see FIG. 15), for example. Communication module 152 includes a client function 152A and a server function 152B.

User program 210 is installed in controllers 100A and 100B on development support device 200. User program 210 includes, for example, as one function thereof, stop module 156 for stopping the process of buffering the packet data by packet monitor module 154, a start module 157 for starting the process of buffering the packet data by packet monitor module 154, and a save module 158 for saving the buffered packet data in the external storage device. The functional modules of controller 100 are typically executed by control device 102 (see FIG. 15).

Since the functions of communication module 152, packet monitor module 154 and stop module 156 are as described above, description of these functions is not repeated.

Communication instruction execution module 151 is a functional module for controlling communication module 152. In one example, in response to accepting an instruction to stop the buffering from stop module 156, communication instruction execution module 151 generates a CIP parameter for generating a CIP message, and outputs the CIP parameter to client function 152A, The CIP parameter will be described later in detail.

Communication driver 153 is software for communication interface 101 (see FIG. 15). Communication driver 153 is provided by a manufacturer depending on the type of communication interface 101, and may be installed in advance or as needed. Controller 100 implements the communication with another controller and development support device 200 via communication driver 153.

In response to accepting the stop instruction, for example, server function 152B stops packet monitor module 154 of its own controller. The stop instruction may be voluntarily issued from its own controller, or may be issued from another controller or development support device 200.

An example where the stop instruction is issued from development support device 200 is described. The user confirms that an error has occurred in one of controllers 100 on development support device 200, and selects controller 100 in which the buffering function is to be stopped on development support device 200. In response, development support device 200 transmits an instruction to stop the buffering function to controller 100A, which is specified controller 100.

Development support device 200 has a communication module 252 and a communication driver 253 as functional modules. Communication module 252 includes a client function 252A. The functional modules of development support device 200 are typically executed by control device 202 (see FIG. 16).

Communication driver 253 is software for communication interface 211 (see FIG. 16). Communication driver 253 is provided by a manufacturer depending on the type of communication interface 211, and may be installed in advance or as needed. Development support device 200 implements the communication with controller 100 via communication driver 253.

<H. CIP Message>

As described above, communication module 152 generates, based on a CIP parameter, a CIP message that defines a control command for packet monitor module 154. Specific examples of the CIP parameter will now be described with reference to FIGS. 18 to 20.

FIG. 18 shows CIP parameters for making settings for packet monitor module 154.

In one example, the CIP parameters include a service code with regard to the setting of enabling/disabling of packet monitor module 154. For example, when "0x4E" is input as the service code, a current set value indicating enabling/disabling of packet monitor module 154 is acquired. When "0x4F" is input as the service code, enabling/disabling of packet monitor module 154 is set in accordance with input.

Additionally, the CIP parameters include a service code with regard to various settings for packet monitor module 154. For example, when "0x50" is input as the service code, various current settings for packet monitor module 154 are acquired. When "0x51" is input as the service code, various settings for packet monitor module 154 are set in accordance with input.

FIG. 19 shows CIP parameters for specifying an instruction to execute packet monitor module 154.

In one example, the CIP parameters include a service code for starting the packet monitoring process of packet monitor module 154 (that is, the process of buffering the packet data). For example, when "0x4B" is input as the service code, the packet monitoring process by packet monitor module 154 is started.

Additionally, the CIP parameters include a service code for stopping the packet monitoring process of packet monitor module 154. For example, when "0x4C" is input as the service code, the packet monitoring process by packet monitor module 154 is stopped.

Additionally, the CIP parameters include a CIP parameter for saving the packet data buffered by packet monitor module 154 in the external storage device. For example, when "0x4D" is input as the service code, the buffered packet data is saved in the external storage device.

FIG. 20 shows a CIP parameter for acquiring a current state of packet monitor module 154.

In one example, the CIP parameter includes a service code for acquiring the current state of packet monitor module 154. For example, when "0x52" is input as the service code, the current state of packet monitor module 154 is acquired. Examples of the state of packet monitor module 154 include a state in which the packet monitoring is set to disabled, a state indicating that the packet monitoring is being stopped, and a state indicating that the packet monitoring is being executed.

<I. Conclusion>

As described above, in response to the predetermined stop condition being satisfied, controller 100 stops the buffering function of packet monitor module 154 for the specified controllers. That is, controller 100 can stop not only the buffering function in its own controller, but also the buffering function in another controller. Thus, not only the loss of packet data buffered in its own controller, but also the loss of packet data buffered in the another controller can be prevented.

<J. Additional Notes>

As described above, the present embodiment includes the following disclosure.

[Configuration 1]

A factory automation (FA) system comprising a plurality of controllers (100A to 100C) each of which controls a driving device to be controlled, the plurality of controllers (100A to 100C) each including:

a buffer (150);

a communication module (152) for performing packet communication with one or more other controllers;

a packet monitor module (154) for buffering packet data generated in its own controller and packet data received by its own controller in the buffer (150); and a stop module (156) for stopping, in response to a predetermined stop condition (108) being satisfied, a buffering function of the packet monitor module (154) for a controller specified from the plurality of controllers (100A to 100C).

[Configuration 2]

The FA system according to configuration 1, wherein the stop module (156) stops, in response to receiving a stop instruction to stop a buffering function from the one or more other controllers, a buffering function of the packet monitor module (154) in its own controller.

[Configuration 3]

The FA system according to configuration 1 or 2, wherein the packet data has source information for identifying a source controller, and destination information for identifying a destination controller, and the FA system further comprises an external device (200) configured to communicate with the plurality of controllers (100A to 100C), the external device (200) including a communication module (252) for receiving packet data stored in the buffer (150) of each of the plurality of controllers (100A to 100C) from each of the plurality of controllers (100A to 100C), and a display (221) for displaying the source information and the destination information about each packet data received from each of the plurality of controllers (100A to 100C).

[Configuration 4]

The FA system according to configuration 3, wherein the display (221) displays packet data having matching source matching destination information in a corresponding manner.

[Configuration 5]

The FA system according to configuration 4, wherein the display (221) displays packet data, in which a pair of packet data having matching source information and matching destination information does not exist, in a display mode different from other packet data.

[Configuration 6]

The FA system according to any one of configurations 1 to 5, wherein the plurality of controllers (100A to 100C) each include an interface unit (139) for connecting an external storage device, and a save module (159) for saving, in response to a predetermined save condition being satisfied, packet data stored in the buffer (150) of the controller specified from the plurality of controllers (100A to 100C) in the external storage device (140) connected to the specified controller.

[Configuration 7]

A controller that controls a driving device to be controlled, the controller comprising:

a buffer (150), a communication module (152) for performing packet communication with one or more other controllers;

a packet monitor module (154) for buffering packet data generated in the controller and packet data received by the one or more other controllers in the buffer (150); and a stop module (156) for stopping, in response to a predetermined stop condition (108) being satisfied, a buffering function of the packet monitor module (154) for the controller or a controller specified from the one or more other controllers.

[Configuration 8]

A method of controlling a controller that controls a driving device to be controlled, the method comprising:

performing packet communication with one or more other controllers;

buffering packet data generated in the controller and packet data received by the one or more other controllers in a buffer (150) of the controller; and stopping, in response to a predetermined stop condition (108) being satisfied, the buffering for the controller or a controller specified from the one or more other controllers.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

10 FA system; 30 development tool; 31 program creation screen; 33 setting screen; 35 event log screen; 37A, 37B collection result screen; 41, 42, 45, 47 setting column; 41A, 42A, 45A, 71, 72 button; 50 save button; 51 cancel button; 60, 61, 62, 63, 64, 65 display column; 70 confirmation screen; 81, 82, 83 broken line portion; 85 input area; 86 display area; 90 hub; 100, 100A, 100B, 100C controller; 101, 211 communication interface; 102, 202 control device; 104 chip set; 106, 204 main memory; 108 stop condition; 109 system program; 110, 208 storage device; 111 control program; 122 internal bus controller; 124 fieldbus controller; 126 I/O unit; 139 memory card interface; 140 memory card; 150 buffer; 151 communication instruction execution module; 152, 252 communication module; 152A, 252A client function; 152B server function; 153, 253 communication driver; 154 packet monitor module; 156 stop Module; 157 start module; 158 save module; 200 development support device; 208A development support program; 210 user program; 210A sequence program; 2101 motion program; 212 setting information; 214 I/O interface; 215 operation unit; 220 display interface; 221 display; 225 internal bus; 300 driving device; 300A robot controller; 300B servo driver; 301A arm robot; 301B servo motor.

The invention claimed is:

1. A factory automation (FA) system comprising a plurality of controllers each of which controls a driving device to be controlled, the plurality of controllers each including a first processor configured with a first program to perform operations comprising:

operation as a buffer;

operation as a communication module for performing packet communication with one or more other controllers;

operation as a packet monitor module for buffering packet data generated in its own controller and packet data received by its own controller in the buffer; and operation as a stop module for stopping, in response to a predetermined stop condition being satisfied, a buffering function of the packet monitor module for a controller specified from the plurality of controllers, wherein the packet data comprises source information for identifying a source controller and destination information for identifying a destination controller, and the FA system further comprises an external device configured to communicate with the plurality of controllers, the external device comprising a second processor configured with a second program to perform operations comprising:

operation as a communication module for receiving packet data stored in the buffer of each of the plurality of controllers from each of the plurality of controllers; and operation as a display for displaying the source information and the destination information about each packet data received from each of the plurality of controllers, wherein the display displays packet data having matching source information and matching destination information in a corresponding manner.

2. The FA system according to claim 1, wherein
the processor of each of the plurality of controllers is configured with the program such that operation as the stop module comprises stopping, in response to receiving a stop instruction to stop a buffering function from the one or more other controllers, a buffering function of the packet monitor module in its own controller.

3. The FA system according to claim 1, wherein
the second processor of the external device is configured with the second program such that operation as the display comprises displaying packet data, in which a pair of packet data having matching source information and matching destination information does not exist, in a display mode different from other packet data.

4. The FA system according to claim 1, wherein
the processor of each of the plurality of controllers is configured with the program to perform operations further comprising
operation as an interface unit for connecting an external storage device, and
operation as a save module for saving, in response to a predetermined save condition being satisfied, packet data stored in the buffer of the controller specified from the plurality of controllers in the external storage device connected to the specified controller.

5. A controller that controls a driving device to be controlled, the controller comprising a first processor configured with a first program to perform operations comprising:
operation as a buffer,
operation as a communication module for performing packet communication with one or more other controllers;
operation as a packet monitor module for buffering packet data generated in the controller and packet data received by the one or more other controllers in the buffer; and
operation as a stop module for stopping, in response to a predetermined stop condition being satisfied, a buffering function of the packet monitor module for the controller or a controller specified from the one or more other controllers, wherein the controller is configured to communicate with an external device comprising a second processor configured with a second program to perform operations comprising:
operation as a communication module for receiving packet data stored in the buffer of each of the controller; and
operation as a display for displaying the source information and the destination information about the packet data received from the controller, wherein the display displays packet data having matching source information and matching destination information in a corresponding manner.

6. A method of controlling a controller that controls a driving device to be controlled, the method comprising:
performing packet communication with one or more other controllers;
buffering packet data generated in the controller and packet data received by the one or more other controllers in a buffer of the controller; and
stopping, in response to a predetermined stop condition being satisfied, the buffering for the controller or a controller specified from the one or more other controllers, wherein
the packet data comprises source information for identifying a source controller and destination information for identifying a destination controller, and
the method further comprises communicating with an external device which receives packet data stored in the buffer of the controller and displays the source information and destination information about the packet data received from the controller, such that packet data having matching source information and matching destination information is displayed in a corresponding manner.

* * * * *